(12) United States Patent
Dwivedi et al.

(10) Patent No.: US 12,458,380 B2
(45) Date of Patent: Nov. 4, 2025

(54) MECHANICAL THROMBECTOMY DEVICE FOR CAPTURE AND REMOVAL OF OCCLUSIONS

(71) Applicant: Neuravi Limited, Galway (IE)

(72) Inventors: Anushree Dwivedi, Galway (IE); Sarah Johnson, Galway (IE); Mahmood Mirza, Galway (IE); Joshua Khan, Galway (IE)

(73) Assignee: Neuravi Limited, Galway (IE)

( * ) Notice: Subject to any disclaimer, the term of this patent is extended or adjusted under 35 U.S.C. 154(b) by 424 days.

(21) Appl. No.: 17/816,388

(22) Filed: Jul. 29, 2022

(65) Prior Publication Data

US 2024/0032953 A1 Feb. 1, 2024

(51) Int. Cl.
*A61B 17/221* (2006.01)
*A61B 17/22* (2006.01)

(52) U.S. Cl.
CPC .. *A61B 17/221* (2013.01); *A61B 2017/22038* (2013.01); *A61B 2017/2215* (2013.01)

(58) Field of Classification Search
CPC .................. A61B 17/221; A61B 17/22; A61B 2017/22038; A61B 2017/2215; A61B 2017/00238; A61B 2017/22035; A61B 2017/22011
See application file for complete search history.

(56) References Cited

U.S. PATENT DOCUMENTS

| | | | |
|---|---|---|---|
| 9,532,792 B2 | 1/2017 | Galdonik et al. | |
| 9,532,873 B2 | 1/2017 | Kelley | |
| 9,533,344 B2 | 1/2017 | Monetti et al. | |
| 9,539,011 B2 | 1/2017 | Chen et al. | |
| 9,539,022 B2 | 1/2017 | Bowman | |
| 9,539,122 B2 | 1/2017 | Burke et al. | |
| 9,539,382 B2 | 1/2017 | Nelson | |
| 9,549,830 B2 | 1/2017 | Bruszewski et al. | |
| 9,554,805 B2 | 1/2017 | Tompkins et al. | |
| 9,561,125 B2 | 2/2017 | Bowman et al. | |
| 9,572,982 B2 | 2/2017 | Burnes et al. | |
| 9,579,484 B2 | 2/2017 | Barnell | |
| 9,585,642 B2 | 3/2017 | Dinsmoor et al. | |

(Continued)

OTHER PUBLICATIONS

International Search Report issued in International Application No. PCT/EP2023/070984 dated Jan. 8, 2024.

(Continued)

*Primary Examiner* — Tan-Uyen T Ho
*Assistant Examiner* — Cherie M Poland
(74) *Attorney, Agent, or Firm* — Troutman Pepper Locke LLP

(57) ABSTRACT

A nested mechanical thrombectomy assembly deliverable as a single assembled unit that includes an outermost mechanical thrombectomy device and at least one inner mechanical thrombectomy device, each mechanical thrombectomy device being actuatable from a radially compressed state to a radially expanded state. While in the radially compressed state, the at least one inner mechanical thrombectomy device is disposed in the inner channel of the outermost mechanical thrombectomy device. Each of the outermost mechanical thrombectomy device and the at least one inner mechanical thrombectomy device is actuatable/deployable independently of one another.

16 Claims, 10 Drawing Sheets

(56) References Cited

U.S. PATENT DOCUMENTS

| | | | |
|---|---|---|---|
| 9,615,832 B2 | 4/2017 | Bose et al. |
| 9,615,951 B2 | 4/2017 | Bennett et al. |
| 9,622,753 B2 | 4/2017 | Cox |
| 9,636,115 B2 | 5/2017 | Henry et al. |
| 9,636,439 B2 | 5/2017 | Chu et al. |
| 9,642,675 B2 | 5/2017 | Werneth et al. |
| 9,655,633 B2 | 5/2017 | Leynov et al. |
| 9,655,645 B2 | 5/2017 | Staunton |
| 9,655,989 B2 | 5/2017 | Cruise et al. |
| 9,662,129 B2 | 5/2017 | Galdonik et al. |
| 9,662,238 B2 | 5/2017 | Dwork et al. |
| 9,662,425 B2 | 5/2017 | Lilja et al. |
| 9,668,898 B2 | 6/2017 | Wong |
| 9,675,477 B2 | 6/2017 | Thompson |
| 9,675,782 B2 | 6/2017 | Connolly |
| 9,676,022 B2 | 6/2017 | Ensign et al. |
| 9,692,557 B2 | 6/2017 | Murphy |
| 9,693,852 B2 | 7/2017 | Lam et al. |
| 9,700,262 B2 | 7/2017 | Janik et al. |
| 9,700,399 B2 | 7/2017 | Acosta-Acevedo |
| 9,717,421 B2 | 8/2017 | Griswold et al. |
| 9,717,500 B2 | 8/2017 | Tieu et al. |
| 9,717,502 B2 | 8/2017 | Teoh et al. |
| 9,724,103 B2 | 8/2017 | Cruise et al. |
| 9,724,526 B2 | 8/2017 | Strother et al. |
| 9,750,565 B2 | 9/2017 | Bloom et al. |
| 9,757,260 B2 | 9/2017 | Greenan |
| 9,764,111 B2 | 9/2017 | Gulachenski |
| 9,770,251 B2 | 9/2017 | Bowman et al. |
| 9,770,577 B2 | 9/2017 | Li et al. |
| 9,775,621 B2 | 10/2017 | Tompkins et al. |
| 9,775,706 B2 | 10/2017 | Peterson et al. |
| 9,775,732 B2 | 10/2017 | Khenansho |
| 9,788,800 B2 | 10/2017 | Mayoras, Jr. |
| 9,795,391 B2 | 10/2017 | Saatchi et al. |
| 9,801,980 B2 | 10/2017 | Karino et al. |
| 9,808,599 B2 | 11/2017 | Bowman et al. |
| 9,833,252 B2 | 12/2017 | Sepetka et al. |
| 9,833,604 B2 | 12/2017 | Lam et al. |
| 9,833,625 B2 | 12/2017 | Waldhauser et al. |
| 10,016,206 B1* | 7/2018 | Yang .................... A61B 17/221 |
| 2013/0345739 A1* | 12/2013 | Brady .................... A61F 2/013 |
| | | 606/200 |
| 2016/0120558 A1* | 5/2016 | Brady .................. A61B 17/221 |
| | | 606/159 |
| 2017/0007264 A1 | 1/2017 | Cruise et al. |
| 2017/0007265 A1 | 1/2017 | Guo et al. |
| 2017/0020670 A1 | 1/2017 | Murray et al. |
| 2017/0020700 A1 | 1/2017 | Bienvenu et al. |
| 2017/0027640 A1 | 2/2017 | Kunis et al. |
| 2017/0027692 A1 | 2/2017 | Bonhoeffer et al. |
| 2017/0027725 A1 | 2/2017 | Argentine |
| 2017/0035436 A1 | 2/2017 | Morita |
| 2017/0035567 A1 | 2/2017 | Duffy |
| 2017/0042548 A1 | 2/2017 | Lam |
| 2017/0049596 A1 | 2/2017 | Schabert |
| 2017/0071737 A1 | 3/2017 | Kelley |
| 2017/0072452 A1 | 3/2017 | Monetti et al. |
| 2017/0079671 A1 | 3/2017 | Morero et al. |
| 2017/0079680 A1 | 3/2017 | Bowman |
| 2017/0079766 A1 | 3/2017 | Wang et al. |
| 2017/0079767 A1 | 3/2017 | Leon-Yip |
| 2017/0079812 A1 | 3/2017 | Lam et al. |
| 2017/0079817 A1 | 3/2017 | Sepetka et al. |
| 2017/0079819 A1 | 3/2017 | Pung et al. |
| 2017/0079820 A1 | 3/2017 | Lam et al. |
| 2017/0086851 A1 | 3/2017 | Wallace et al. |
| 2017/0086996 A1 | 3/2017 | Peterson et al. |
| 2017/0095259 A1 | 4/2017 | Tompkins et al. |
| 2017/0100126 A1 | 4/2017 | Bowman et al. |
| 2017/0100141 A1 | 4/2017 | Morero et al. |
| 2017/0100143 A1 | 4/2017 | Grandfield |
| 2017/0100183 A1 | 4/2017 | Iaizzo et al. |
| 2017/0113023 A1 | 4/2017 | Steingisser et al. |
| 2017/0147765 A1 | 5/2017 | Mehta |
| 2017/0151032 A1 | 6/2017 | Loisel |
| 2017/0165062 A1 | 6/2017 | Rothstein |
| 2017/0165065 A1 | 6/2017 | Rothstein et al. |
| 2017/0165454 A1 | 6/2017 | Tuohy et al. |
| 2017/0172581 A1 | 6/2017 | Bose et al. |
| 2017/0172766 A1 | 6/2017 | Vong et al. |
| 2017/0172772 A1 | 6/2017 | Khenansho |
| 2017/0189033 A1 | 7/2017 | Sepetka et al. |
| 2017/0189035 A1 | 7/2017 | Porter |
| 2017/0215902 A1 | 8/2017 | Leynov et al. |
| 2017/0216484 A1 | 8/2017 | Cruise et al. |
| 2017/0224350 A1 | 8/2017 | Shimizu et al. |
| 2017/0224355 A1 | 8/2017 | Bowman et al. |
| 2017/0224467 A1 | 8/2017 | Piccagli et al. |
| 2017/0224511 A1 | 8/2017 | Dwork et al. |
| 2017/0224953 A1 | 8/2017 | Tran et al. |
| 2017/0231749 A1 | 8/2017 | Perkins et al. |
| 2017/0252064 A1 | 9/2017 | Staunton |
| 2017/0265983 A1 | 9/2017 | Lam et al. |
| 2017/0281192 A1 | 10/2017 | Tieu et al. |
| 2017/0281331 A1 | 10/2017 | Perkins et al. |
| 2017/0281344 A1 | 10/2017 | Costello |
| 2017/0281909 A1 | 10/2017 | Northrop et al. |
| 2017/0281912 A1 | 10/2017 | Melder et al. |
| 2017/0290593 A1 | 10/2017 | Cruise et al. |
| 2017/0290654 A1 | 10/2017 | Sethna |
| 2017/0296324 A1 | 10/2017 | Argentine |
| 2017/0296325 A1 | 10/2017 | Marrocco et al. |
| 2017/0303939 A1 | 10/2017 | Greenhalgh et al. |
| 2017/0303942 A1 | 10/2017 | Greenhalgh et al. |
| 2017/0303947 A1 | 10/2017 | Greenhalgh et al. |
| 2017/0303948 A1 | 10/2017 | Wallace et al. |
| 2017/0304041 A1 | 10/2017 | Argentine |
| 2017/0304097 A1 | 10/2017 | Corwin et al. |
| 2017/0304595 A1 | 10/2017 | Nagasrinivasa et al. |
| 2017/0312109 A1 | 11/2017 | Le |
| 2017/0312484 A1 | 11/2017 | Shipley et al. |
| 2017/0316561 A1 | 11/2017 | Helm et al. |
| 2017/0319826 A1 | 11/2017 | Bowman et al. |
| 2017/0333228 A1 | 11/2017 | Orth et al. |
| 2017/0333236 A1 | 11/2017 | Greenan |
| 2017/0333678 A1 | 11/2017 | Bowman et al. |
| 2017/0340383 A1 | 11/2017 | Bloom et al. |
| 2017/0348014 A1 | 12/2017 | Wallace et al. |
| 2017/0348514 A1 | 12/2017 | Guyon et al. |
| 2018/0140315 A1* | 5/2018 | Bowman ............... A61B 17/221 |
| 2018/0206865 A1* | 7/2018 | Martin .................. A61B 17/221 |
| 2020/0297376 A1* | 9/2020 | Marks ............ A61B 17/320725 |
| 2021/0275201 A1 | 9/2021 | Martin et al. |
| 2021/0322038 A1 | 10/2021 | Dwivedi et al. |

OTHER PUBLICATIONS

Related, co-pending, co-owned U.S. Appl. No. 17/816,386, filed Jul. 29, 2022.

Gupta et al., "New Class of Radial Adjustable Stentrivers for Acute Ischemic stroke", Stroke, vol. 52, pp. 1534-1544 (May 2021).

* cited by examiner

MECHANICAL THROMBECTOMY DEVICE FOR CAPTURE AND REMOVAL OF OCCLUSIONS

FIELD OF THE INVENTION

The present invention relates to a mechanical thrombectomy device used in endovascular thrombectomy treatment to capture and remove an occlusion. In particular, the present invention is directed to a nested mechanical thrombectomy assembly comprising two or more mechanical thrombectomy devices deliverable as a single assembled unit and independently actuatable of one another for use in endovascular treatment of occlusion(s). Furthermore, the present invention is also directed to a mechanical thrombectomy device whose distal section is bifurcated, divisible, separable, or splitable into a plurality of secondary self-expanding cage structures to capture in tandem vessel occlusions in respective branch vessels of a branching site (e.g., bifurcation).

DESCRIPTION OF RELATED ART

Arteries or vessels in the brain may be become occluded resulting in acute ischemic stroke (AIS). Endovascular treatment procedures or therapies include a mechanical thrombectomy device navigated through the vasculature to capture and retrieve the target occlusion. Occlusions may be identified in various areas of the vasculature of the brain. For instance, the occlusion may be located in a major artery of the anatomy of the brain (e.g., Internal Carotid Artery (ICA), ICA terminus (T-lesion; T occlusion), Middle Cerebral Artery (MCA), M1 MCA. Vertebral Artery, or Basilar Artery) or vessels downstream distally thereof (hereinafter "distal vessels"), typically of smaller diameter relative to a major artery of the brain. These distal vessels often become occluded due to distal embolization arising from unintended fragmentation and/or escape from retrieval devices during manipulation of an original/primary occlusion more proximal relative thereto. To achieve maximum benefits, capture and retrieval of such distal occlusion to achieve recanalization of these distal vessels is desirable, however, the current technology is insufficient having several drawbacks and health risks. Additional challenges are at play when treating occlusion in distal vessels. One aspect is that distal vessels are often very tortuous and require longer devices to access, which in turn increases the difficulty of navigating and tracking catheters to these location as they often lose pushability. Additionally, the tissue surrounding these vessels is delicate/fragile and brain structures are subject to possible significant movement during retrieval. Occlusions in these distal vessels are typically treated using conventional mechanical thrombectomy devices (e.g., conventional stent retrievers). A substantial risk of damaging the blood vessels, rupture or perforators, vasospasm and even hemorrhage arises when using a conventional mechanical thrombectomy device (e.g., conventional stent retriever) in the treatment of embolization located in distal vessels.

It would be desirable to develop an improved mechanical thrombectomy device that reduces these risks thereby improving overall outcome of capture and full removal of all occlusions including those located in a distal vessel. Furthermore, it would be desirable to develop an improved mechanical thrombectomy device providing a longer working length than conventional devices suitable to reach and capture occlusion located in distal vessels. It is further desirable to develop an improved mechanical thrombectomy device with an enhanced grip on the captured occlusion minimizing possible unintentional release during retrieval through the tortuous pathway of the distal vessels while reducing the friction force imparted on the fragile blood vessel wall thereby minimizing the risk of complications due to bleeding.

SUMMARY OF THE INVENTION

An aspect of the invention is directed to a nested mechanical thrombectomy assembly that reduces these risks thereby improving overall outcome of capture and removal of one or more occlusions including occlusions located in a distal vessel.

Another aspect of the present invention relates a nested mechanical thrombectomy assembly including an outermost mechanical thrombectomy device and at least one inner mechanical thrombectomy device. The at least one inner mechanical thrombectomy device having a smaller distal section suitable for retrieval of occlusion located in smaller distal vessels while minimizing the friction force imparted on the fragile blood vessel wall thereby minimizing the risk of complications due to bleeding. Furthermore, the reduced outer diameter/outer profile of the actuated inner mechanical thrombectomy device forms a tighter grip on the captured distal embolization thereby reducing the risk of unintentional release while navigating the tortuous pathway of the distal vessels during retrieval of the captured clot.

Yet another aspect of the present invention relates to a nested mechanical thrombectomy assembly whose working length in an axial/longitudinal direction is maximized.

Still another aspect of the present invention is directed to a nested mechanical thrombectomy device having a larger outer diameter/outer profile mechanical thrombectomy device and at least one smaller outer diameter/outer profile mechanical thrombectomy device, each independently actuatable of the other.

While yet another aspect of the present invention relates to a nested mechanical thrombectomy assembly including two self-expanding cage structures (e.g., stent retrievers) deliverable and retrievable as a single assembled unit via a single microcatheter to a target site in the vessel.

In still a further aspect of the present invention a nested mechanical thrombectomy assembly for optimizing full or entire removal of the clot (including potential fragmentation) in a single pass.

Another aspect of the present invention relates to a nested mechanical thrombectomy assembly comprising a single assembled unit of two or more mechanical thrombectomy devices including an outermost mechanical thrombectomy device and at least one inner mechanical thrombectomy device. All mechanical thrombectomy devices may be actuated/deployed independently of each other (i.e., full actuation/deployment in which all mechanical thrombectomy devices are actuated/deployed albeit independently of each other during treatment for the occlusion). Alternatively, less than all mechanical thrombectomy devices may be actuated/deployed independently of each other (i.e., partial actuation/deployment in which one or more mechanical thrombectomy devices are never actuated/deployed during treatment of the occlusion). For instance, only the outermost mechanical thrombectomy device or only the inner mechanical thrombectomy device, but not both, may be actuated/deployed during treatment.

While yet another aspect of the present invention is directed to a nested mechanical thrombectomy assembly deliverable as a single assembled unit. The nested mechanical thrombectomy assembly includes an outermost mechanical thrombectomy device actuatable from a radially compressed state to a radially expanded state. The outermost mechanical thrombectomy device forming an inner channel extending in an axial direction. In addition, the nested mechanical thrombectomy device further includes a proximal shaft having a lumen extending in an axial direction therethrough. A distal end of the proximal shaft is connected to a proximal end of the outermost mechanical thrombectomy device such that the inner channel is in communication with the lumen of the proximal shaft. Moreover, nested mechanical thrombectomy device includes at least one inner mechanical thrombectomy device actuatable from a radially compressed state to a radially expanded state. While in the radially compressed state, the at least one inner mechanical thrombectomy device is disposed in the inner channel of the outermost mechanical thrombectomy device. Also included in the nested mechanical thrombectomy device is a wire extending through the lumen of the proximal shaft and connected to a proximal end of the at least one inner mechanical thrombectomy device. Each of the outermost mechanical thrombectomy device and the at least one inner mechanical thrombectomy device is actuatable independently of one another.

In yet another aspect of the present invention relates to a mechanical thrombectomy device including a proximal section and a distal section; and wherein the proximal section is a single primary self-expanding cage structure while the distal section is a plurality of secondary self-expanding cage structures connected to each other only at an interface with the single primary self-expanding cage structure and releasably securable together in direct physical contact. Each of the single primary self-expanding cage structure and the plurality of secondary self-expanding cage structures being actuatable from the radially compressed state to the radially expanded state.

While still another aspect of the prevent invention is directed to a branched microcatheter including a proximal section comprising a single tubular structure integral with or secured to a branched distal section comprising a plurality of separate branch tubular structures. The single tubular structure of the proximal section and each of the plurality of separate branch tubular structures of the branched distal section has an associated lumen in fluid communication with each other at an interface between the proximal section and branched distal section.

Yet another aspect of the present invention relates to a method for using a nested mechanical thrombectomy assembly including an outermost mechanical thrombectomy device actuatable from a radially compressed state to a radially expanded state; the outermost mechanical thrombectomy device forming an inner channel extending in an axial direction. The nested mechanical thrombectomy assembly further includes a proximal shaft having a lumen extending in an axial direction therethrough; wherein the proximal shaft is connected to a proximal end of the outermost mechanical thrombectomy device such that the inner channel is in communication with the lumen of the proximal shaft. Still further the nested mechanical thrombectomy assembly also includes at least one inner mechanical thrombectomy device actuatable from a radially compressed state to a radially expanded state; the at least one inner mechanical thrombectomy device is disposed in the inner channel of the outermost mechanical thrombectomy device. In addition, the nested mechanical thrombectomy assembly also includes a wire disposed within the lumen of the proximal shaft and connected to a proximal end of the at least one inner mechanical thrombectomy device. Each of the outermost mechanical thrombectomy device and the at least one inner mechanical thrombectomy device is actuatable independently of one another. The method for using the nested mechanical thrombectomy assembly includes navigating a guidewire through a vessel to a target site. A single microcatheter is then tracked over the guidewire. Thereafter the guidewire is withdrawn in a proximal direction from the single microcatheter. While each of the single outermost mechanical thrombectomy device and the at least one inner mechanical thrombectomy device are in the radially compressed state, the nested mechanical thrombectomy assembly is advanced through the single microcatheter. At least one occlusion is captured in the nested mechanical thrombectomy assembly by independently actuating: (i) the single outermost mechanical thrombectomy device; and/or (ii) the at least one inner mechanical thrombectomy device. Simultaneously the single microcatheter and the nested mechanical thrombectomy assembly along with the at least one occlusion captured therein are withdrawn from the vessel.

In a still further aspect, the present invention relates to a method for capture of a clot in a vessel. A guidewire is navigated through the vessel to a branching site in which a single vessel branches off into multiple branch vessels. Next, a single microcatheter is tracked over the guidewire to the branching site; wherein the single microcatheter comprises a proximal section having a single lumen and a branched distal section of a plurality of branch lumen; and wherein while tracking over the guidewire the plurality of separate branch lumen of the branched distal section of the single microcatheter are releasably secured together. The guidewire is withdrawn in a proximal direction from the single microcatheter. Thereafter, the plurality of branch lumen of the branched distal section of the single microcatheter are released and allowed to separate. Simultaneously the separated plurality of branch lumen of the branched distal section of the single microcatheter are advanced in a distal direction into the respective branch vessels at the branching site. Next, a mechanical thrombectomy device including a proximal section and a distal section is advanced through the single microcatheter to a position proximally of the branched distal section; wherein the proximal section is a single primary self-expanding cage structure while the distal section is a plurality of secondary self-expanding cage structures connected to each other only at an interface with the primary self-expanding cage structure; the plurality of secondary self-expanding cage structures being releasably securable together in direct physical contact in an axial direction while advancing through the single microcatheter to the branched distal section. While positioned proximally of the branched distal section in the single microcatheter, the plurality of secondary self-expanding cage structures of the mechanical thrombectomy device are released and allowed to separate. The separate plurality of secondary self-expanding cage structures of the mechanical thrombectomy device are advanced in a distal direction into respective ones of the separated plurality of branch lumen of the branched distal section of the single microcatheter positioned in the respective multiple branch vessels at the branching site. Then, the separate plurality of secondary self-expanding cage structures unsheathed from the respective ones of the separate plurality of branch lumen of the branched distal section of the single microcatheter are actuated traversing and capturing in tandem in the actuated separate plurality of secondary self-expanding cage structures at least one occlusion disposed in the branch vessels of the branching site. It is then that the plurality of secondary self-expanding cage structures together with the at least one occlusion captured therein are drawn back into the branched lumen of the single microcatheter. Simultaneously the branched microcatheter and the mechanical thrombectomy device along with the captured occlusions therein are then withdrawn in the proximal direction.

In yet another aspect of the present invention is directed to a method for capture of a clot in a vessel by navigating a guidewire through the vessel to a branching site in which a single vessel branches off into multiple branch vessel and then tracking a single microcatheter over the guidewire to the branching site. In a proximal direction the guidewire is withdrawn from the single microcatheter. A mechanical thrombectomy device including a proximal section and a distal section is advanced through the single microcatheter; wherein the proximal section is a single primary self-expanding cage structure while the distal section is a plurality of secondary self-expanding cage structures connected to each other only at an interface with the primary self-expanding cage structure; the plurality of secondary self-expanding cage structures being releasably securable together in direct physical contact while advanced through the single microcatheter. It is then that the plurality of secondary self-expanding cage structures are released and allowed to separate. Next, the separate plurality of secondary self-expanding cage structures are advanced in a distal direction into respective ones of the multiple branch vessels at the branching site traversing at least one occlusion therein. The single primary self-expanding cage structure and the separate plurality of secondary self-expanding cage structures unsheathed from the single microcatheter are actuated capturing in tandem the at least one occlusion therein. The single primary self-expanding cage structure and the plurality of secondary self-expanding cage structures together with the at least one occlusion captured therein are drawn back into the single microcatheter. Simultaneously or sequentially one after the other, the single microcatheter and the mechanical thrombectomy device along with the at least one occlusion capture therein are withdrawn in the proximal direction.

BRIEF DESCRIPTION OF THE DRAWING

The foregoing and other features of the present invention will be more readily apparent from the following detailed description and drawings illustrative of the invention wherein like reference numbers refer to similar elements throughout the several views and in which.

DETAILED DESCRIPTION OF THE INVENTION

Figure 1A:
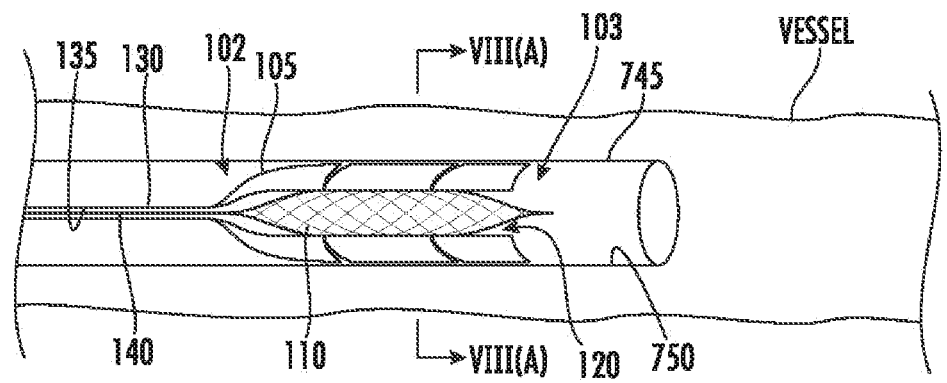
FIG. 1A is a side view depicting a first use of an example of the present inventive nested mechanical thrombectomy assembly including a single outermost mechanical thrombectomy device and a single inner mechanical thrombectomy device deliverable as a single assembled unit via a single microcatheter (having a non-branched cylindrical tube configuration) to a target site in the vessel; wherein the outermost mechanical thrombectomy device is depicted in a non-actuated/non-deployed state (i.e., radially compressed state sheathed within the lumen of the microcatheter) and the inner mechanical thrombectomy device is depicted in a non-actuated/non-deployed state (i.e., radially compressed) sheathed within the inner axial/longitudinal channel of the outermost mechanical thrombectomy device.

In the description, the terms "distal" or "proximal" are used in the following description with respect to a position or direction relative to the treating physician or medical interventionalist. "Distal" or "distally" are a position distant from or in a direction away from the physician or interventionalist. "Proximal" or "proximally" or "proximate" are a position near or in a direction toward the physician or medical interventionist. The terms "occlusion", "clot", "blockage" or "embolus" are used interchangeably.

The benefits of the present inventive nested mechanical thrombectomy assembly may be described herein with regard to the capture and retrieval of distal occlusion(s) (i.e., occlusion(s) located downstream distally of the main artery), but is nevertheless suitable for occlusions in other locations. Various configurations or designs for capture and retrieval of occlusions are presented.

In a first exemplary configuration, the present inventive nested mechanical thrombectomy assembly may comprise two or more mechanical thrombectomy devices independently actuatable of one another. As a single assembled unit, the nested mechanical thrombectomy assembly is deliverable via a single microcatheter (having a non-branched cylindrical tube configuration) for capture and retrieval of one or more vessel occlusion(s). Generically, the nested mechanical thrombectomy assembly includes a single primary mechanical thrombectomy device with one or more supplemental mechanical thrombectomy devices disposed or nested within an inner axial/longitudinal channel of the single primary mechanical thrombectomy device, wherein each mechanical thrombectomy device is independently actuatable of each other. When all mechanical thrombectomy devices are in a non-actuated/non-deployed state, the single primary thrombectomy device is disposed radially outward relative to the one or more supplemental mechanical thrombectomy devices disposed ("nested") in the inner axial/longitudinal channel of the single primary mechanical thrombectomy device. Based on their arrangement relative to each other while in a non-actuated/non-deployed state, the single primary mechanical thrombectomy device is hereinafter referred to as an "outermost mechanical thrombectomy device" while the one or more supplemental mechanical thrombectomy device(s) is hereinafter referred to as one or more "inner mechanical thrombectomy device(s)." Alternative terminology may be used to differentiate among the mechanical thrombectomy devices such as a single "larger mechanical thrombectomy device" having a greater outer diameter/outer profile in comparison to the one or more "smaller mechanical thrombectomy devices" each having a smaller outer diameter/outer profile in comparison therewith while each is in an actuated/deployed state. While still alternative terminology may be employed to differentiate among the mechanical thrombectomy devices relative to one another once actuated/deployed. Specifically, a single "proximal mechanical thrombectomy device" and one or more "distal thrombectomy devices" since when all mechanical thrombectomy devices are actuated/deployed within the vasculature each of the one or more distal thrombectomy device(s) extend further distally relative to the single proximal mechanical thrombectomy device. Any of these or alternative terms may be used to differentiate among the independently actuatable mechanical thrombectomy devices comprising the nested mechanical thrombectomy assembly in accordance with the present invention.

Figure 1B:
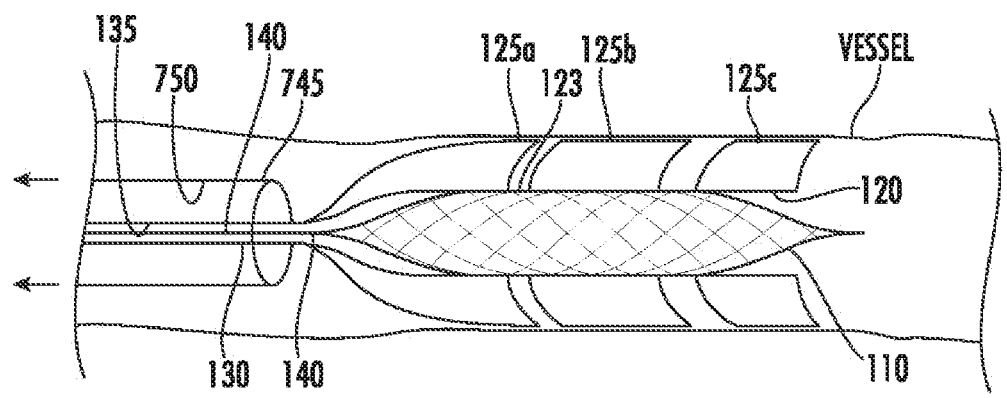
FIG. 1B is a side view of the nested mechanical thrombectomy assembly of FIG. 1A depicting the outermost mechanical thrombectomy device in an actuated/deployed state (i.e., radially expanded state unsheathed from the microcatheter) and the inner mechanical thrombectomy device sheathed in the inner axial/longitudinal channel of the outermost mechanical thrombectomy device in a non-actuated/non-deployed state (i.e., radially compressed state)
Figure 1C:
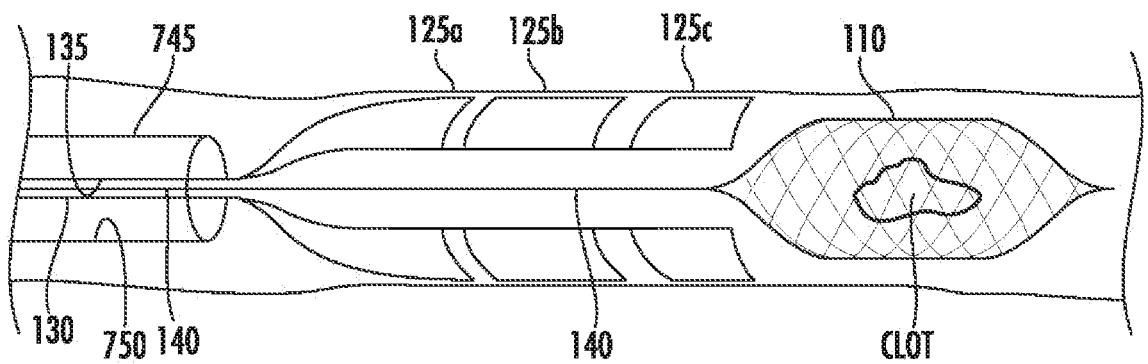
FIG. 1C is a side view of the nested mechanical thrombectomy assembly of FIG. 1A in a fully actuated/deployed state with the outermost mechanical thrombectomy device in an actuated/deployed state (i.e., radially expanded state unsheathed from the microcatheter) and the inner mechanical thrombectomy device in an actuated/deployed state (i.e., radially expanded state unsheathed from the outermost mechanical thrombectomy device)

The exemplary nested mechanical thrombectomy assembly depicted in FIGS. 1A-1C includes a single outermost mechanical thrombectomy device 105 with an inner mechanical thrombectomy device 110 nested or assembled therein, wherein each mechanical thrombectomy device 105, 110 is independently actuatable of one another. The descriptive terms "outermost" and "inner" refers to the arrangement in a radial direction of the independently actuatable mechanical thrombectomy devices while "nested" together in a compressed, non-actuated state. That is, the term "outermost" refers to the arrangement in a radial direction of the mechanical thrombectomy device 105 (i.e., no other mechanical thrombectomy device is disposed radially outward relative to the outermost mechanical thrombectomy device 105). The single outermost mechanical thrombectomy device 105 has a proximal end 102, an opposite distal end 103, and an axial/longitudinal channel 120 defined therethrough.

In the exemplary configuration of FIGS. 1A-1C, outermost mechanical thrombectomy device 105 has an articulated segmented design including three scaffolding sections 125a, 125b, 125c (i.e., cells) arranged in series one after the other in an axial/longitudinal direction. First scaffolding section 125a is connected at its proximal end to a proximal shaft 130 (e.g., tube) having an axial/longitudinal lumen 135 defined therethrough. The self-expanding cage structure of each scaffolding section 125a, 125b, 125c is formed by one or more struts attached to one another via connection points forming a central body 123 forming an inner axial/longitudinal channel 120 therein. The present invention is in no way limited to the particular design of the self-expanding cage structure serving as the outermost mechanical thrombectomy device 105. Although the drawings depict the self-expanding cage structure of the outermost mechanical thrombectomy device 105 as including a plurality of articulated segmented scaffolding sections connected in series one after the other in an axial/longitudinal direction, alternatively a single section self-expanding cage structure may be employed. If the self-expanding cage structure of the outermost mechanical thrombectomy device is configured as a plurality of articulated segmented scaffolding sections, the number of scaffolding sections, as well as the number of struts for each scaffolding section, the arrangement thereof, and connection points associated therewith may be modified, as desired.

Nested or disposed within the inner axial/longitudinal channel 120 of the single outermost mechanical thrombectomy device 105 is the inner mechanical thrombectomy device 110, wherein each mechanical thrombectomy device 105, 110 is independently actuatable of the other. An outer diameter/outer profile of the inner mechanical thrombectomy device 110 is radially compressed (i.e., non-actuated/non-deployed state) when nested, assembled or sheathed in the inner axial or longitudinal channel 120 of the single outermost mechanical thrombectomy device 105. The single outermost mechanical thrombectomy device 105 is actuated or deployed (i.e., transitioning from a non-actuated/non-deployed radially compressed state to an actuated or deployed radially self-expanded state) by unsheathing from (i.e., withdrawing or pulling in a proximal direction) the microcatheter 745. Independently thereof, actuation or deployment (i.e., transition from a non-actuated/non-deployed radially compressed state to an actuated or deployed radially expanded state) of the inner mechanical thrombectomy device 110 is achieved when unsheathed from the outermost mechanical thrombectomy device 105. For instance, by pushing the inner mechanical thrombectomy device 110 out from the distal end or tip of the outermost mechanical thrombectomy device 105 while the outermost mechanical thrombectomy device remains stationary in position within the vessel.

Figure 8A:
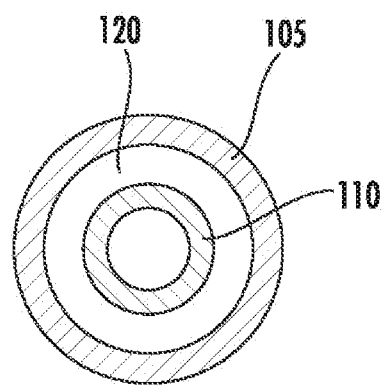
FIG. 8A is a radial cross-sectional view along lines VIII(A)-VIII(A) through the nested mechanical thrombectomy assembly of FIG. 1A comprising a single outermost mechanical thrombectomy device and a single inner mechanical thrombectomy device nested therein.
Figure 8B:
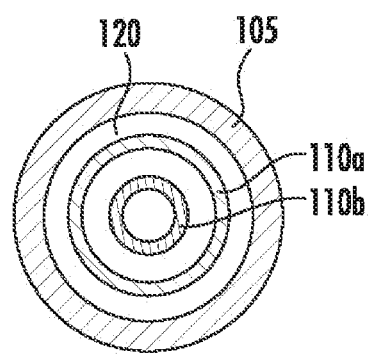
FIG. 8B is an alternative configuration to that of FIG. 8A wherein the nested mechanical thrombectomy assembly includes three concentrically arranged mechanical thrombectomy devices (i.e., a single outermost mechanical thrombectomy device and two inner mechanical thrombectomy devices)
Figure 8C:
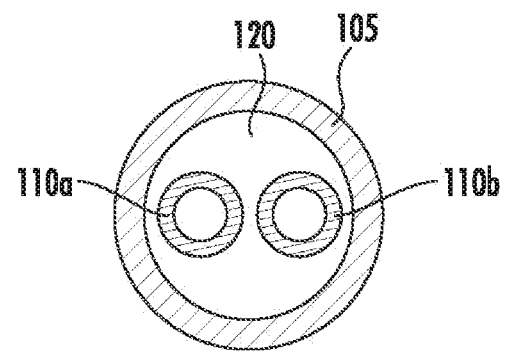
FIG. 8C is another configuration to that of FIG. 8A wherein the nested mechanical thrombectomy assembly includes two inner mechanical thrombectomy devices arranged in parallel with each other while nested within in a single outermost mechanical thrombectomy device.

In the exemplary configuration of FIG. 1A, the nested mechanical thrombectomy assembly comprises two mechanical thrombectomy devices 105, 110 arranged concentrically one inside the other. Specifically, a single inner mechanical thrombectomy device 110 arranged concentrically in the inner axial/longitudinal channel 120 of the single outermost mechanical thrombectomy device 105. FIG. 8A is a radial cross-sectional view along lines VIII(A)-VIII(A) through the nested mechanical thrombectomy assembly of FIG. 1A. As previously mentioned, the present invention contemplates that more than one independently actuatable inner mechanical thrombectomy device may be nested in the inner axial/longitudinal channel of the outermost mechanical thrombectomy device. In such design, within the inner axial/longitudinal channel of the outermost mechanical thrombectomy device the multiple inner mechanical thrombectomy devices may be: (i) arranged concentrically (e.g., the second inner mechanical thrombectomy device 110b disposed within an axial/longitudinal passageway of the first inner mechanical thrombectomy device 110a)(FIG. 8B); or (ii) arranged in parallel in an axial/longitudinal direction (e.g., the first and second inner mechanical thrombectomy devices 110a, 110b arranged parallel to each other in an axial/longitudinal direction) and both housed in the inner axial/longitudinal channel 120 of the single outermost mechanical thrombectomy device 105)(FIG. 8C).

Figure 9A:
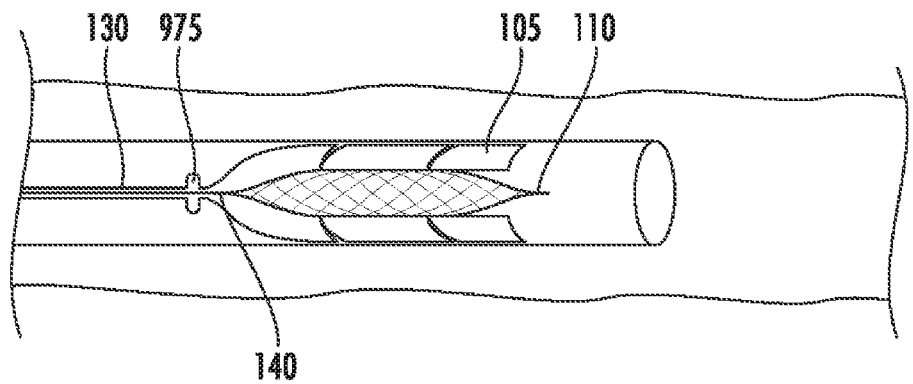
FIG. 9A depicts the nested mechanical thrombectomy device of FIG. 2A including an exemplary mechanical restraining device.

To prevent premature or unintentional actuation (i.e., movement in a distal direction) of the inner mechanical thrombectomy device 110 in relation to the outermost mechanical thrombectomy device 105, a mechanical structure may optionally be employed such as a mechanical restraining device. Any type of mechanical restraining device may be used that allows movement in a distal direction of the inner mechanical thrombectomy device relative to the outer mechanical thrombectomy device only when subject to an intentionally applied force sufficient to overcome that imposed by the mechanical restraining device. The mechanical restraining device 975 is depicted in FIG. 9A as a securing ring physically crimped about the proximal shaft 130 of the nested mechanical thrombectomy assembly imposing an inward radial force on the proximal shaft 130 clamping down upon the wire 140 disposed therein. As the nested mechanical thrombectomy assembly is delivered as a single assembled unit through the microcatheter to the target site the securing ring 975 prevents unintentional actuation/deployment of the inner mechanical thrombectomy device 110. Actuation or deployment of the inner mechanical thrombectomy device 110 requires intentional application of a force in a distal direction on the wire 140 sufficient to overcome (i.e., exceed) the restraining force imposed by the securing ring 975.

Figure 9B:
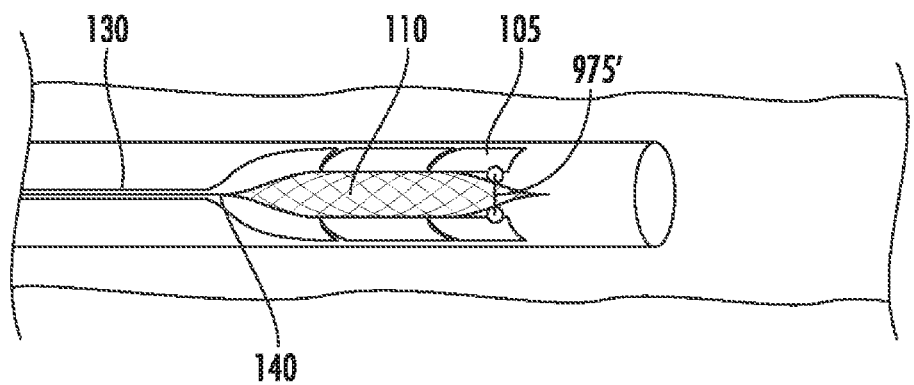
FIG. 9B depicts the nested mechanical thrombectomy device of FIG. 2A having an alternative exemplary mechanical restraining device.

The mechanical restraining device 975 in FIG. 9A is disposed proximally of the assembled mechanical thrombectomy devices 105, 110. Alternatively, the mechanical restraining device may be disposed between the inner mechanical thrombectomy device 110 and the outermost inner thrombectomy device 105. In FIG. 9B, for example, the mechanical retaining device is an auxiliary wire 975' cinched about the radially compressed internal mechanical thrombectomy device 110 while in a non-deployed/non-actuated state within the inner axial/longitudinal channel 120 and connected, secured or attached to the outermost mechanical thrombectomy device 105. Application of a predetermined force in a distal direction on the wire 140 advances the inner mechanical thrombectomy device 110 while the outermost mechanical thrombectomy device 105 remains in position breaking, snapping or severing the auxiliary wire 975' that restrained movement of the inner mechanical thrombectomy device 110 with respect to the outermost mechanical thrombectomy device 105. No longer secured together (i.e., released), continued application of force in the distal direction on the wire 140 unsheathes the inner mechanical thrombectomy device 110 from the outermost mechanical thrombectomy device 105 actuating the inner mechanical thrombectomy device.

It is noted that the use of a mechanical restraining device is optional and may be eliminated altogether whereby the inner mechanical thrombectomy device 110 at all times while in the microcatheter is axially/longitudinally freely movable relative to the outermost mechanical thrombectomy device 105. In such instance in which the mechanical restraining device is eliminated, the inner mechanical thrombectomy device 110 is actuatable by the interventionalist applying a force in a distal direction (e.g., pushing) on the wire 140 secured to the proximal end thereof.

FIGS. 1A-1C depict sequential stages or steps undertaken in use of the nested mechanical thrombectomy assembly wherein all mechanical thrombectomy devices (e.g., the single outermost and the inner mechanical thrombectomy devices 105, 110) are actuated albeit independently of each other (hereinafter referred to as "full deployment or full actuation" of the nested mechanical thrombectomy device). In particular, actuation of the single outermost mechanical thrombectomy device 105 occurs first followed thereafter by subsequent actuation of the one or more inner mechanical thrombectomy device(s) 110. Use of the present inventive nested mechanical thrombectomy assembly in this manner serves a multi-functional purpose. Initial actuation of the outermost mechanical thrombectomy device 105 may serve as an anchor within the vessel during navigation distally thereof of the subsequent actuation or deployment of the one or more inner mechanical thrombectomy device(s) 110 to capture and retrieve the distal occlusion.

Figure 7:
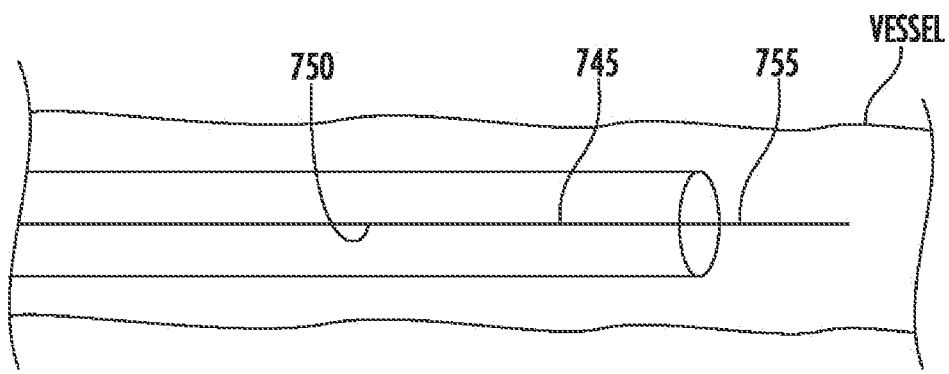
FIG. 7 depicts preliminary steps in the endovascular treatment or procedure in accordance with any of the configurations of the present invention in which a guidewire is initially navigated to a target site in the vessel and a microcatheter is tracked over the guidewire.

FIG. 7 depicts preliminary steps in the endovascular treatment or procedure for all present inventive mechanical thrombectomy device described herein. Typically, entering the body via the femoral artery in the thigh near the groin, a guidewire 755 is navigated through the vessel to a target site. Thereafter, a single microcatheter 745 is tracked over the guidewire 755. With the distal end of the single microcatheter 745 properly positioned at the target site in the vessel the guidewire 755 is withdrawn in a proximal direction. While both the single outermost and the inner mechanical thrombectomy devices 105, 110 are in a non-actuated/non-deployed state (i.e., radially compressed) a force in a distal direction is applied to the proximal shaft 130 advancing the single assembled unit 100 through the single microcatheter 745 to the target site in the vessel (FIG. 1A).

Withdraw (i.e., pulling in proximal direction, as depicted by the arrows in FIG. 1B) of the single microcatheter 745 unsheathes the single outermost mechanical thrombectomy device 105. Due to the memory shape material in which it is manufactured, when unsheathed from the microcatheter 745 the single outermost mechanical thrombectomy device 105 self-expands radially outward (e.g., increases in outer diameter/outer profile). When actuated/deployed the single outermost mechanical thrombectomy device 105 is in direct physical contact against the inner wall of the vessel anchoring it in place (FIG. 1B). In this preliminary state some, but not all, mechanical thrombectomy devices are actuated/deployed) (FIG. 1B). Specifically, the single outermost mechanical thrombectomy device 105 is independently actuated/deployed while the inner mechanical thrombectomy device 110 is maintained in a non-actuated/non-deployed state (i.e., radially constrained/compressed within the inner axial/longitudinal channel 120 of the outermost mechanical thrombectomy device 105).

With the actuated/deployed single outermost mechanical thrombectomy device 105 anchored in position within the vessel, the inner mechanical thrombectomy device 110 is subsequently independently actuated/deployed. This is accomplished by the interventionalist applying a force in a distal direction on the wire 140 attached to the proximal end thereof causing the inner mechanical thrombectomy device 110 at its opposite distal end to be unsheathed from the outermost mechanical thrombectomy device 105 (FIG. 1C). No longer radially constrained/compressed within the inner axial/longitudinal channel 120 of the outermost mechanical thrombectomy device 105, the actuated/deployed inner thrombectomy device 110 self-expands radially. With continued advancement in a distal direction, the actuated/deployed inner thrombectomy device 110 engages with the target distal occlusion which embeds therein. Following capture, the interventionalist applies a force (e.g., pulling) in a proximal direction on the wire 140 radially compressing the inner mechanical thrombectomy device (along with the captured occlusion therein) as it reverts into (i.e., drawn back through) the inner axial/longitudinal channel 120 of the outermost mechanical thrombectomy device 105. Next, the interventionalist pulls on the proximal shaft 130 drawing back into the microcatheter 745 while being radially compressed (i.e., reduced in outer diameter or outer profile) the outermost mechanical thrombectomy device 105 and the inner mechanical thrombectomy device 110 nested therein. Thus, during retrieval of the captured occlusion using the present inventive nested mechanical thrombectomy assembly the interventionalist need only manipulate or operate a single device (i.e., the single assembled unit comprising the nested mechanical thrombectomy assembly), rather than two separate, distinct mechanical thrombectomy devices one after the other, employing only a single microcatheter.

Figure 3A:
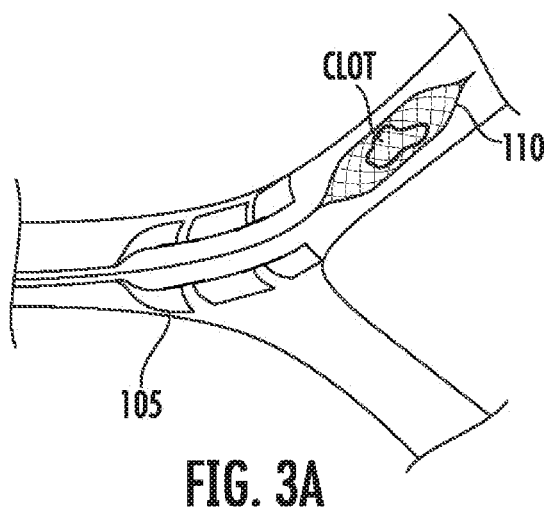
FIG. 3A depicts the present inventive nested mechanical thrombectomy assembly of FIG. 1A in a fully actuated/deployed state with the actuated/deployed outermost mechanical thrombectomy device positioned at a branching site in which a single vessel branches off into multiple branch vessels with the actuated/deployed inner mechanical thrombectomy device further advanced into only one of the multiple branch vessels capturing a distal occlusion in that particular branch vessel.
Figure 3B:
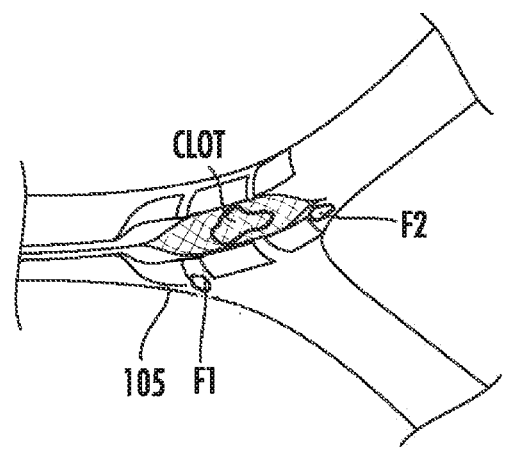
FIG. 3B depicts use of the present inventive nested mechanical thrombectomy assembly of FIG. 3A illustrating during retrieval (i.e., withdraw in a proximal direction) of the inner mechanical thrombectomy device along with the captured distal occlusion therein any loose debris or fragments (f1, f2) being captured in the actuated/deployed outermost mechanical thrombectomy device positioned on the proximal side of the branching site.
Figure 4A:
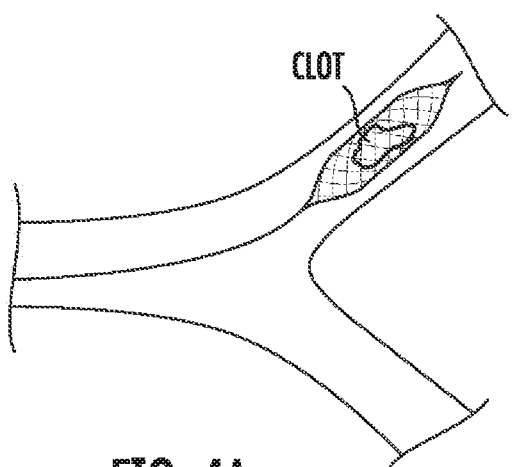
FIG. 4A depicts use of a prior art mechanical thrombectomy device in an actuated/deployed state capturing therein a distal occlusion located in a single branch vessel at a branching site.
Figure 4B:
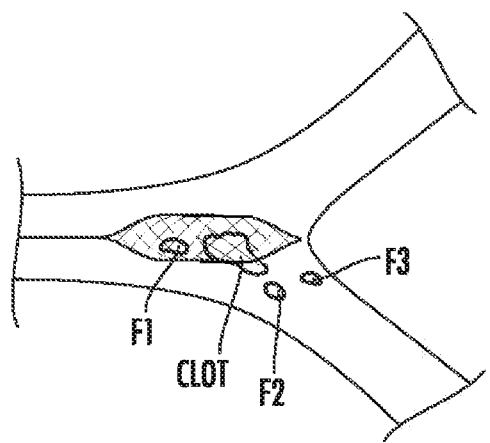
FIG. 4B depicts retrieval (i.e., withdraw in a proximal direction) of the prior art mechanical thrombectomy device of FIG. 4A and captured distal occlusion embedded therein illustrating loose debris or fragments (f2, f3) undesirably traveling into another branch vessel of the branching site.

The initial independent actuation/deployment of the outermost mechanical thrombectomy device 105 may have benefits beyond that of serving as an anchor in the vessel while navigating through the tortuous pathway of distal vessels during deployment of the inner mechanical thrombectomy device 110. This additional advantage comes into play with use of the prevent inventive nested mechanical thrombectomy assembly during capture of a target occlusion in a branch vessel at a branching site (i.e., where a single vessel branches off into multiple branch vessels). FIG. 3A depicts full deployment of the present inventive nested mechanical thrombectomy assembly at a branching site (i.e., a site in which a single vessel divides or splits off into two or more branch vessels). The actuated/deployed single outermost mechanical thrombectomy device 105 is anchored in position on a proximal side/face of the branching site. Subsequent actuation or deployment of the inner mechanical thrombectomy device 110 when unsheathed from the outermost mechanical thrombectomy device 105 is then advanced into one branch vessel to capture the clot therein. FIG. 3B depicts retrieval of the clot embedded in the inner mechanical thrombectomy device 110 together radially compressed while retrieved/drawn back into the inner axial/longitudinal channel 120 of the single outermost mechanical thrombectomy device 105 in response to the interventionalist pulling in a proximal direction on the wire 140. In comparison therewith, FIGS. 4A & 4B illustrate similar actions using a conventional smaller outer diameter single cage mechanical thrombectomy device at the same branch site. Referring to FIG. 4B, during retrieval using the conventional smaller outer diameter single cage mechanical thrombectomy device as a result of a relatively low apposition with the vessel wall there is an increased risk of the captured clot becoming freed which along with any loose debris or fragments ($f_2$, $f_3$) may undesirably enter another branch vessel of the branching site. However, the present inventive independently actuatable nested mechanical thrombectomy device 100 eliminates this potential risk whereby any loose debris or fragments ($f_1$, $f_2$) is captured in the previously actuated/deployed single outermost mechanical thrombectomy device 105 (FIG. 3B) positioned at the proximal side/face of the branching site.

Figure 2A:
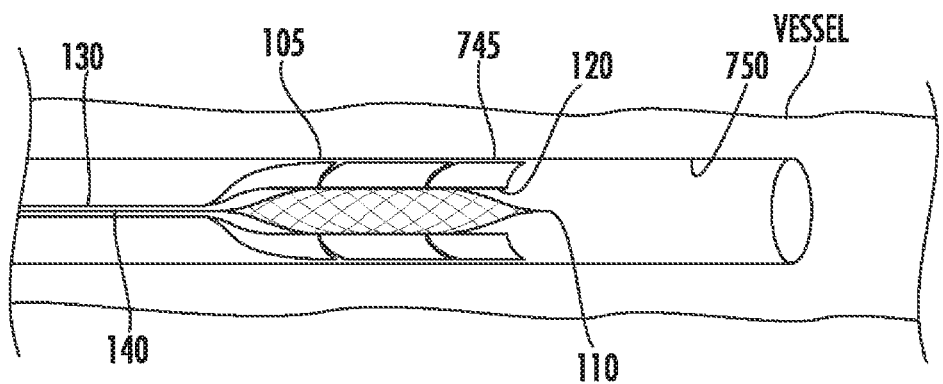
FIG. 2A is a side view example depicting a second use of the present inventive nested mechanical thrombectomy assembly of FIG. 1A; wherein the single outermost mechanical thrombectomy device is depicted in a non-actuated state (i.e., radially compressed state unsheathed from the microcatheter) and the inner mechanical thrombectomy device is depicted in a non-actuated state (i.e., radially compressed state) sheathed in the inner axial/longitudinal channel of the outermost mechanical thrombectomy device.
Figure 2B:
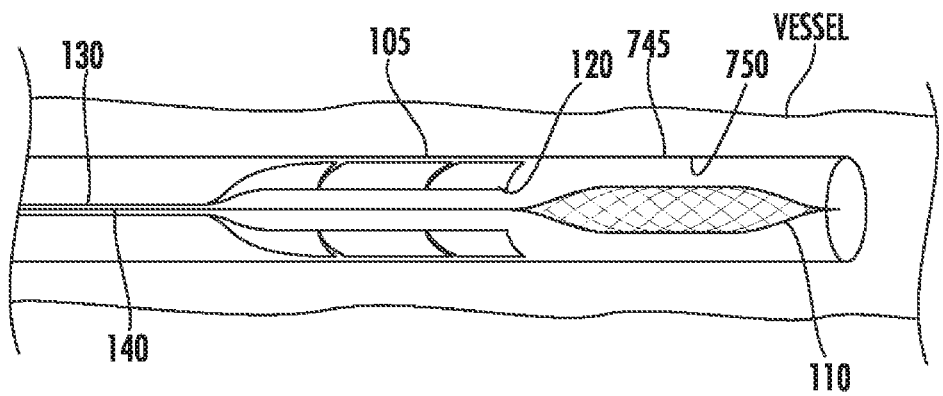
FIG. 2B is a side view of the example nested mechanical thrombectomy assembly of FIG. 2A depicting the outermost mechanical thrombectomy device in a non-actuated state (i.e., radially compressed state sheathed in the lumen of the microcatheter) while the inner mechanical thrombectomy device is in an actuated state (i.e., radially expanded state unsheathed from the outermost mechanical thrombectomy device) but still housed within the microcatheter.
Figure 2C:
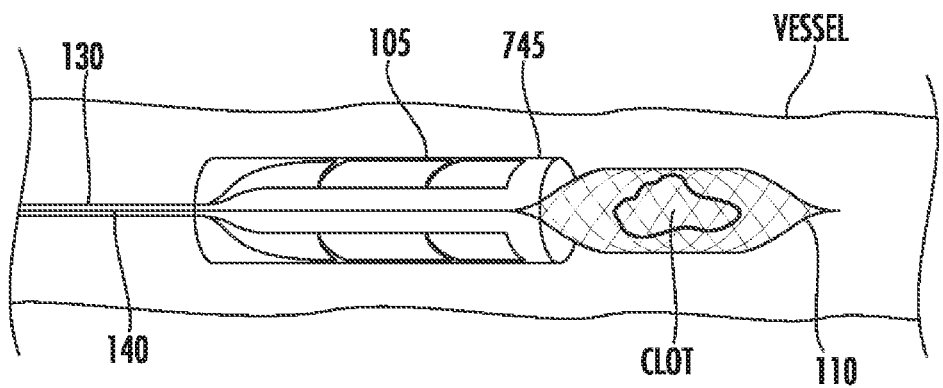
FIG. 2C is a side view of the example nested mechanical thrombectomy assembly of FIG. 2A depicting the outermost mechanical thrombectomy device remaining in a non-actuated state (i.e., radially compressed state sheathed in the lumen of the microcatheter) while the inner mechanical thrombectomy device is in an actuated/deployed state (i.e., radially expanded state unsheathed from the outermost mechanical thrombectomy device) and fully extended in an axial/longitudinal direction pushed out from the distal end of the microcatheter capturing the distal occlusion in the vessel.

Since each mechanical thrombectomy device comprising the nested mechanical thrombectomy assembly are actuatable independently of one another, in particular circumstances it may be desirable to initiate only partial actuation/partial deployment of less than all of the mechanical thrombectomy devices. For example, either the single outermost mechanical thrombectomy device 105 or the inner mechanical thrombectomy device 110 may never be actuated/deployed (i.e., remain non-actuated/non-deployed). In one such instance, the outer thrombectomy device 105 is maintained in a non-actuated/non-deployed state (i.e., radially compressed while sheathed in the lumen of the microcatheter 745) while access to an occlusion distally thereof is realized by actuating/deploying only the inner mechanical thrombectomy device 110 nested therein. Once again, referring to FIG. 7 typically entering the body through the femoral artery in the thigh near the groin, a guidewire 755 is navigated through the vessel to a target site. Thereafter, a single microcatheter 745 is tracked over the guidewire 755. With the distal end of the single microcatheter 745 properly positioned at the target site in the vessel the guidewire 755 is withdrawn in a proximal direction. While both the outermost and the inner mechanical thrombectomy devices 105, 110 are in a non-actuated/non-deployed state (i.e., radially compressed) a force in a distal direction is applied to the proximal shaft 130 advancing the nested mechanical thrombectomy assembly 100 as a single assembled unit through the single microcatheter 745 to the target site in the vessel (FIG. 2A). In contrast to FIGS. 1A-1C, the outermost mechanical thrombectomy device 105 in FIGS. 2A-2C is never actuated/deployed. That is, throughout the entire treatment or procedure the outermost mechanical thrombectomy device 105 is maintained in a non-actuated/deployed state sheathed in the lumen 750 of the microcatheter 745. While the outer thrombectomy device 105 is maintained in a non-actuated state sheathed within the lumen 750 of the microcatheter 745, independently thereof the inner mechanical thrombectomy device 105 is actuated/deployed to capture and retrieve a distal occlusion. Specifically, to capture the occlusion the interventionalist applies a force in a distal direction (e.g., pushing) on the wire 140 thereby advancing the inner mechanical thrombectomy device 110 secured thereto (FIG. 2B). Upon exiting from the distal end of the inner axial/longitudinal channel 120 of the outer mechanical thrombectomy device 105, the inner mechanical thrombectomy device 110 automatically transitions to an actuated/deployed state (i.e., radially expanded) (FIG. 2B). The actuated/deployed inner mechanical thrombectomy device 110 preferably has an outer diameter/outer profile smaller than that of the non-actuated/non-deployed outermost mechanical thrombectomy device 105 able to navigate through smaller diameter distal vessels in which the occlusion is located. FIG. 2C shows the actuated/deployed inner mechanical thrombectomy device 110 unsheathed from the distal end of the microcatheter 745 on its travels through the distal vessel to the reach the occlusion. Following capture, the interventionalist applies a force (e.g., pulling) in a proximal direction on the wire 140 radially compressing the inner mechanical thrombectomy device 110 (along with the occlusion captured therein) as it reverts (i.e., drawn back) into the inner axial/longitudinal channel 120 of the non-actuated/non-deployed outermost mechanical thrombectomy device 105 still sheathed in the microcatheter 745. Next, the interventionalist pulls in the proximal direction on the proximal shaft 130 reverting/drawing as a single assembled unit the outermost mechanical thrombectomy device 105 together with the nested inner mechanical thrombectomy device and captured clot therein through the microcatheter 745.

It is to be noted that in the exemplary illustration in FIG. 2A the nested mechanical thrombectomy assembly as a single assembled unit, rather than be advanced to the distal end/tip of the microcatheter 745, stops a predetermined distance in a proximal direction thereof. Thus, in FIG. 2B, once unsheathed from the outermost mechanical thrombectomy device 105 thereafter the inner mechanical thrombectomy device 110 while in an actuated/deployed state travels a predetermined distance through the microcatheter 745. As an alternative thereto, the nested mechanical thrombectomy assembly as a single assembled unit may be advanced to the distal end of the microcatheter 745 such that once unsheathed from the outermost mechanical thrombectomy device 105, the actuated/deployed inner mechanical thrombectomy device 110 need not travel through the microcatheter 745.

The nested mechanical thrombectomy assembly may be specifically configured for use at a branching site (i.e., wherein a single vessel branches off into multiple distal branch vessels) to capture in tandem distal embolization/occlusion in more than one distal branch vessel (FIGS. 5A-5E). Once again, the nested mechanical thrombectomy assembly comprising the inner mechanical thrombectomy device 510 nested inside an inner axial/longitudinal channel 520 of the outermost mechanical thrombectomy device 505 is advanced as a single assembled unit through a single microcatheter 745 (configured as a non-branched cylindrical tube) to a target site in the vessel. In this particular design, the inner mechanical device 510 comprises two sections, i.e., a proximal section 565 (including the proximal end/tip) and a distal section 575 (including the distal end/tip). Proximal section 565 comprises a primary self-expanding cage structure, while the distal section 575 is bifurcated, divisible, split or separable into two or more axially/longitudinally extending secondary self-expanding cage structures 585*a*, 585*b* releasably securable (e.g., twisted) together. In the example depicted in FIGS. 5A-5E, inner mechanical device 510 has a forked distal section with two secondary self-expanding cage structures 585*a*, 585*b*. A proximal end of each secondary self-expanding cage structure 585*a*, 585*b* is secured to or integral with a distal end of the primary self-expanding cage structure 565. While nested/housed in the inner axial/longitudinal channel 520 of the outermost mechanical thrombectomy device 505, the non-actuated/non-deployed (i.e., radially compressed) secondary self-expanding cage structures 585*a*, 585*b* are preferably releasably secured/held (e.g., twisted) together in direct physical contact with each other in an axial/longitudinal direction. Whereupon, the inner mechanical thrombectomy device 510 automatically actuates/deploys, upon emerging out from the distal end of the outermost mechanical thrombectomy device 505. Unsheathed from the outermost mechanical thrombectomy device 505, the secondary self-expanding cage structures 585*a*, 585*b* automatically disengage/release (e.g., untwist) from one another so that the secondary self-expanding cage structures 585*a*, 585*b* are no longer in direct physical contact in an axial/longitudinal direction. As they separate from one another, the secondary self-expanding cage structures 585*a*, 585*b* automatically revert back to their original radially self-expanded configuration (i.e., actuated/deployed state).

In FIGS. 5A-5E when unsheathed from the outermost thrombectomy device 505, the secondary self-expanding cage structures 585*a*, 585*b* automatically disengage or separate from one another allowing each to self-expand radially. Under certain circumstances, it may be beneficial to maintain the secondary self-expanding cage structures 585*a*, 585*b* engaged/secured together despite being unsheathed from the outermost mechanical thrombectomy device. In such case, disengagement, release or separation of the secondary cage structures 585*a*, 585*b* only occurs in response to an affirmative action on the part of the interventionalist (e.g., pulling on a release wire) at a desired location in the vessel.

Although the particular design of the nested mechanical thrombectomy assembly comprising two secondary self-expanding cage structures 585*a*, 585*b* (in FIGS. 5A-5E) is particularly well suited for capture of embolization located in one or more branch vessel(s) at a branching site, such assembly may nevertheless also be used to capture a single embolization within a single, non-branching vessel (e.g., maintaining the secondary self-expanding cage structures secured together).

To reach embolization located in a distal vessel the length in an axial/longitudinal direction of the inner mechanical thrombectomy device may intentionally to designed to exceed that of the inner axial/longitudinal channel 520 of the outermost mechanical thrombectomy device 505 in which it is nested (hereinafter referred to as "extra, extended or supplemental length"). Prior to assembly in the inner axial/longitudinal channel 520 of the outermost mechanical thrombectomy device 505, the secondary self-expanding cage structures 585*a*, 585*b* of the inner mechanical thrombectomy device 510 while in a non-actuated/non-deployed state (i.e., radially compressed) are secured/held (e.g., twisted) together in direct physical contact with each other in an axial/longitudinal direction. To accommodate within the inner axial/longitudinal channel 520 of the outermost mechanical thrombectomy device 505 the extra, extended or supplemental length in an axial/longitudinal direction of the inner mechanical thrombectomy device 510, a distal portion is folded-over onto itself. Specifically, while the non-actuated/non-deployed secondary self-expanding cage structures 585*a*, 585*b* are secured/held (e.g., twisted) together a distal end/tip is drawn-back in a proximal direction over itself until the axial/longitudinal length of the inner mechanical thrombectomy device 510 is less than or equal to that of the inner axial/longitudinal channel 520 of the outermost mechanical thrombectomy device 505. Inner mechanical thrombectomy device 510 is depicted as having a forked (i.e., split or divided) distal section comprising two secondary self-expanding cage structures 585a, 585b releasably secured together (e.g., twisted), as well as being folded over onto itself. Folding over onto itself the secondary self-expanding cage structures while secured together is an optional feature to be employed as desired.

FIGS. 5A-5E depict sequential steps in deployment of the present inventive nested mechanical thrombectomy device. By way of illustrative example, the distal section 575 of the inner mechanical thrombectomy device 510 comprises two secondary self-expanding cage structures 585a, 585b extending in an axial/longitudinal direction. The distal section 575 of the inner mechanical thrombectomy device 510 may be designed, as desired, to have any number of two or more secondary self-expanding cage structures extending in an axial/longitudinal direction. Moreover, among the secondary self-expanding cage structures the configuration (e.g., number, arrangement, and connection points for the struts) may, but need not necessarily be, the same. In the example depicted in FIG. 5A to ensure that the target occlusion(s) is reached/captured the length in an axial/longitudinal direction of the inner mechanical device in an actuated/deployed state exceeds the length in an axial/longitudinal direction of the inner axial/longitudinal channel 520 of the outermost mechanical thrombectomy deice 505. Accordingly, while the non-actuated/non-deployed secondary self-expanding cage structures 585a, 585b are releasably secured/held together (e.g., twisted together) in direct physical contact with one another in an axial/longitudinal direction, the distal end/tip is drawn back/folded-over onto itself (hereinafter referred to as a "folded-over portion") in a proximal direction so that the extra length doesn't exceed that of the inner axial/longitudinal channel 520 of the outermost mechanical thrombectomy device 505.

Figure 5A:
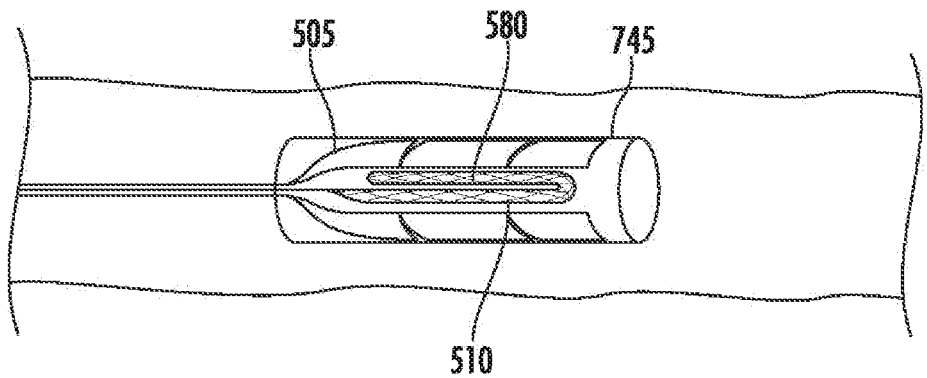
FIG. 5A depicts an alternative design of the present inventive nested mechanical thrombectomy assembly including a single outermost mechanical thrombectomy device and a single inner mechanical thrombectomy device deliverable as a single assembled unit via a single microcatheter (having a non-branched cylindrical tube configuration) to a branching site in which a single vessel branches off into multiple branch vessels; wherein the outermost mechanical thrombectomy device is depicted in a non-actuated/non-deployed state (i.e., radially compressed state sheathed within the lumen of the microcatheter) and the inner mechanical thrombectomy device is depicted in a non-actuated/non-deployed state (i.e., radially compressed state); wherein a distal portion of the inner mechanical thrombectomy device starting from the distal end/tip is folded-over onto itself in a proximal direction while sheathed within the inner axial/longitudinal channel of the outermost mechanical thrombectomy device; and the inner mechanical thrombectomy device has a distal section that is bifurcated, divisible, separable or splitable into a plurality of secondary self-expanding cage structures when actuated/deployed.
Figure 5B:
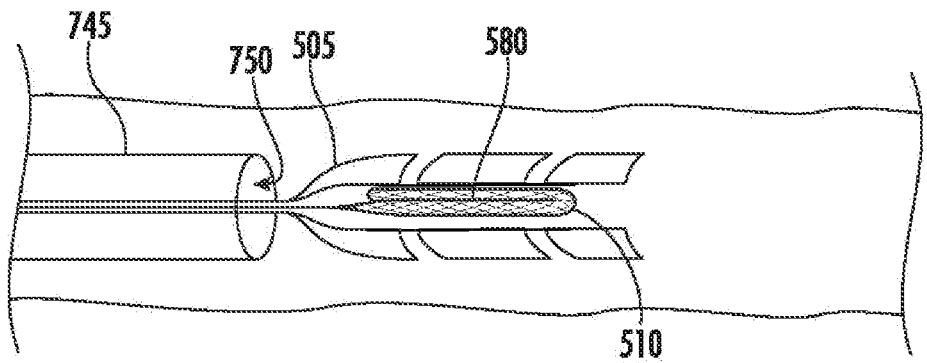
FIG. 5B depicts the nested mechanical thrombectomy assembly of FIG. 5A; wherein the outermost mechanical thrombectomy device is depicted in an actuated/deployed state (i.e., radially expanded state unsheathed from the microcatheter) while the inner mechanical thrombectomy device remains in a non-actuated/non-deployed state (i.e., radially compressed state) with the distal portion starting from the distal end/tip folded-over onto itself while sheathed within the inner axial/longitudinal channel of the outermost mechanical thrombectomy device.

As described above with respect to the previous embodiments of the present invention, a guidewire 755 is initially navigated through the vessel to a target site, e.g., a branching site. A single microcatheter 745 (having a non-branched cylindrical tube configuration) with a lumen 750 is then tracked over the guidewire 755. The guidewire 755 is thereafter withdrawn in a proximal direction from the microcatheter 745 that remains in place in the vessel. While the outermost mechanical thrombectomy device 505 and the inner mechanical thrombectomy device 510 nested therein are each in a non-actuated/non-deployed state, the nested mechanical thrombectomy assembly is advanced as a single assembled unit through the lumen 750 of the microcatheter 745 to a proximal side/face of the target branching site (FIG. 5A). Next, the microcatheter 745 is withdrawn in a proximal direction unsheathing the outermost mechanical thrombectomy device 505 causing it to automatically radially self-expand, while the inner mechanical thrombectomy device 510 nested therein remains non-actuated/non-deployed (i.e., radially compressed) with a distal portion of the distal section drawn back/folded-over onto itself (FIG. 5B). As previously mentioned, the folded-over section 580 of the inner mechanical thrombectomy device 510 is optionally used in those circumstances in which the extra/extended length in the axial/longitudinal direction provided to reach/capture occlusion(s) in a distal branch vessel would not otherwise be accommodated in the inner axial/longitudinal channel 520 of the outermost mechanical thrombectomy device 505.

Figure 5C:
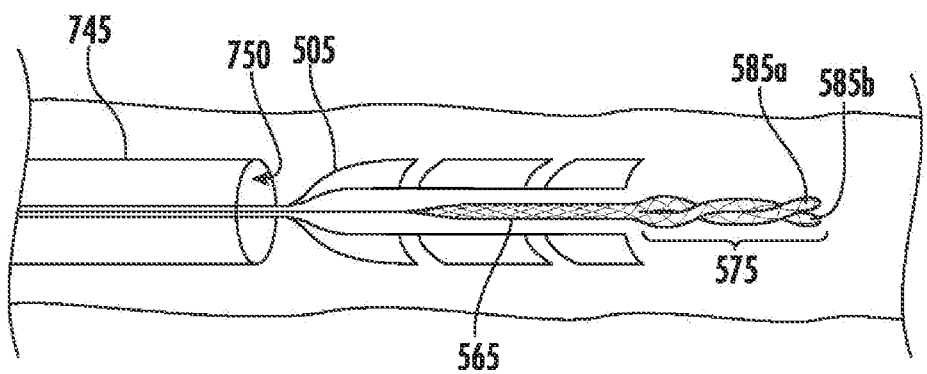
FIG. 5C depicts the nested mechanical thrombectomy assembly of FIG. 5A; wherein the outermost mechanical thrombectomy device is depicted in an actuated/deployed state (i.e., radially expanded state unsheathed from the microcatheter) and the inner mechanical thrombectomy device is in an actuated/deployed state (i.e., radially expanded state unsheathed from the outermost mechanical thrombectomy device) with the distal portion folded-over onto itself is unfurled/unfolded while the secondary cage structures remain releasably secured (e.g., twisted) together in direct physical contact with each other in an axial/longitudinal direction.
Figure 5D:
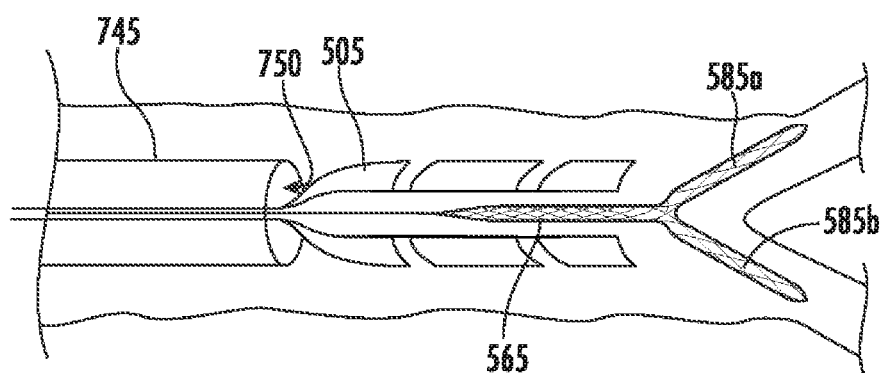
FIG. 5D depicts the nested mechanical thrombectomy assembly of FIG. 5A; wherein the outermost mechanical thrombectomy device is depicted in an actuated/deployed state (i.e., radially expanded state unsheathed from the microcatheter) and the inner mechanical thrombectomy device is in an actuated/deployed state (i.e., radially expanded state unsheathed from the outermost mechanical thrombectomy device) with the secondary cage structures no longer secured together so as to be bifurcated, divisible, split or separated from each other.
Figure 5E:
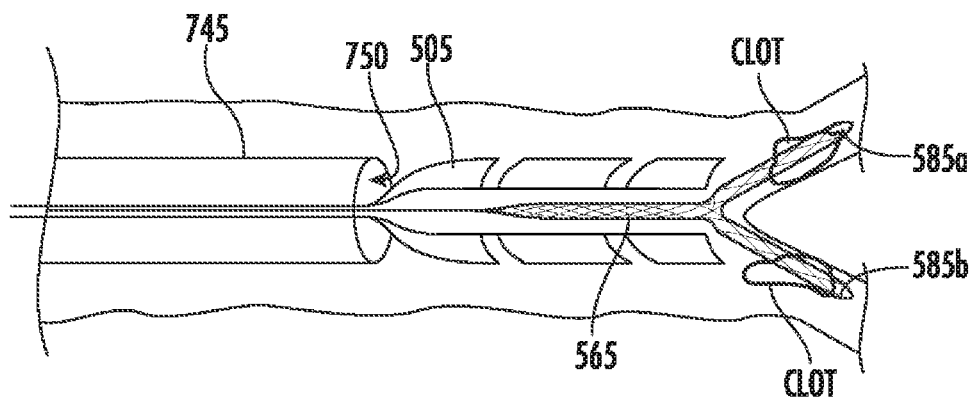
FIG. 5E depicts the nested mechanical thrombectomy assembly of FIG. 5D with the bifurcated/split/separate secondary cage structures simultaneously advanced into respective branch vessels of the branching site capturing in tandem distal occlusion in each branch vessel.

Pushing in a proximal direction on the wire 540 causes the inner mechanical thrombectomy device 510 to emerge out from the distal end of the outermost mechanical thrombectomy device 505. When unsheathed from the outermost mechanical thrombectomy device 505 the folded-over distal section 580 of the inner mechanical thrombectomy device 510 made of a memory shape material automatically reverts back to its original unfolded/unfurled configuration (i.e., fully extended in an axial/longitudinal direction) (FIG. 5C). Once unsheathed and unfurled/unfolded, the secondary self-expanding cage structures 585a, 585b self-expand radially (FIG. 5C). Next, either automatically (e.g., untwist) or in response to an affirmative action by the interventionalist (e.g., disengage by pulling on a release wire), the secondary self-expanding cage structures 585a, 585b disengage or separate reverting back to their original configuration bifurcated, divided, split or separated from each other (e.g., V-shaped, forked, like extended fingers) (FIG. 5D). At this point the separated secondary self-expanding cage structures 585a, 585b are simultaneously advanced in a distal direction into respective branch vessels capturing in tandem distal occlusion therein (FIG. 5E). Once again, any dislodged debris or fragments of the clot may be captured by the actuated/deployed outermost mechanical thrombectomy device 505 disposed on a proximal side/face of the branching site.

Distal embolization in more than one branch vessel of a branching site may be retrieved and captured in tandem using a specifically designed branched microcatheter 745' including a proximal single tubular structure 745'a integral with or secured to a branched distal section comprising two or more separable branch tubular structures 745'b (FIGS. 6A-6D). Each tubular structure 745'a, 745'b has its own associated lumen in fluid communication with each other at the interface in which they come together. By way of example in FIGS. 6A-6D the branched distal section includes two separable branch tubular structures 745'b arranged in a Y-shape or V-shape configuration. However, the branched distal section of the microcatheter may be modified, as desired, to include more than two separable branch tubular structures, each having its own associated lumen in fluid communication with each other at an interface with the proximal single tubular structure. The branched microcatheter is used to deliver to a vessel branching site a mechanical thrombectomy device whose distal section is bifurcated, divisible, splitable or separable into a plurality of secondary self-expanding cage structures.

Figure 6A:
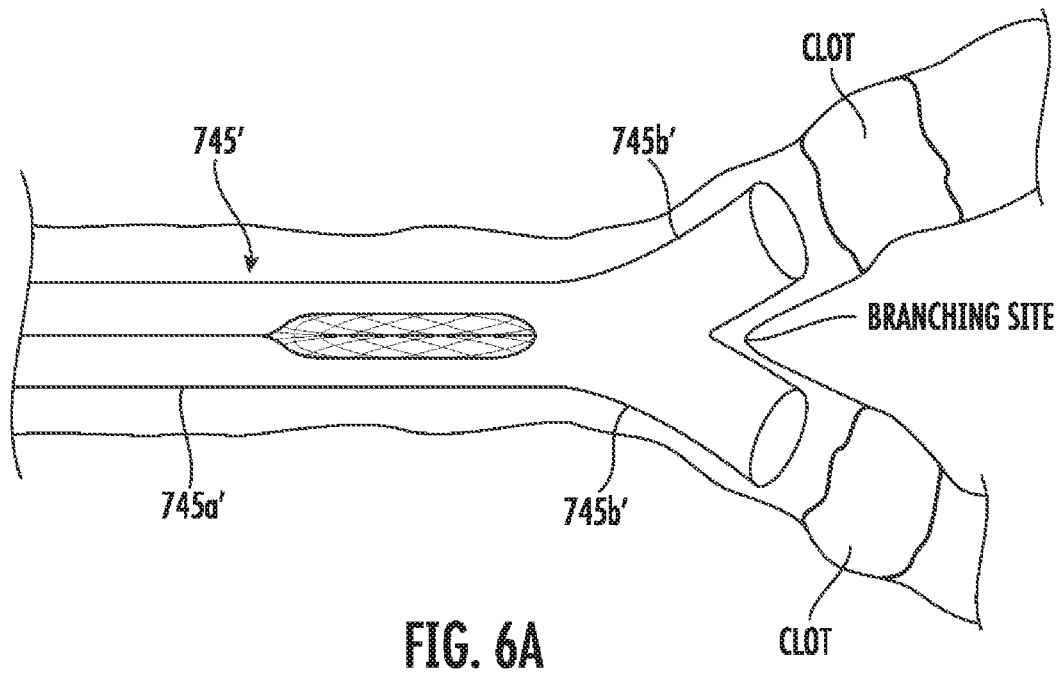
FIG. 6A is an alternative configuration of a mechanical thrombectomy device deliverable via a branched microcatheter having a branched distal section to a branching site in which a single vessel branches off into multiple branch vessels; the mechanical thrombectomy device has a single primary self-expanding cage structure proximal section and a bifurcated, divisible, splitable or separable distal section of two secondary self-expanding cage structures (e.g., forked or V-shape); wherein the mechanical thrombectomy device is depicted in a non-actuated/non-deployed state (i.e., radially compressed state) traversing the proximal section of the branched microcatheter with the secondary self-expanding cage structures releasably secured together in direct physical contact with each other in an axial/longitudinal direction.

In use, a guidewire 755 is initially navigated through the vessel to a position on a proximal face/side of a branching site. The separate branch tubular structures 745'b are preferably releasably secured together allowing the branched microcatheter 745' to be tracked unhindered over the guidewire 755 to the target branching site. Guidewire 755 is subsequently withdrawn in a proximal direction from the branched microcatheter 745' that remains in place in the vessel. Next, the branch tubular structures 585a, 585b of the branched microcatheter 745' are released allowing them to revert to their original bifurcated, divisible, split or separated state. The respective branch tubular sections 745'b of the microcatheter may be retained together by any type of releasable securing mechanism (e.g., twisting or via a mechanical latch device disengaged when subject to a pulling force in a proximal direction by the interventionalist). Once released, the respective branch tubular sections 745'b of the branched microcatheter 745' revert to their original separated arrangement. Further pushing in a proximal direction simultaneously advances together the separated branch tubular structures 745'*b* of the microcatheter 745' into respective branch vessels (as depicted in FIG. 6A).

Figure 6B:
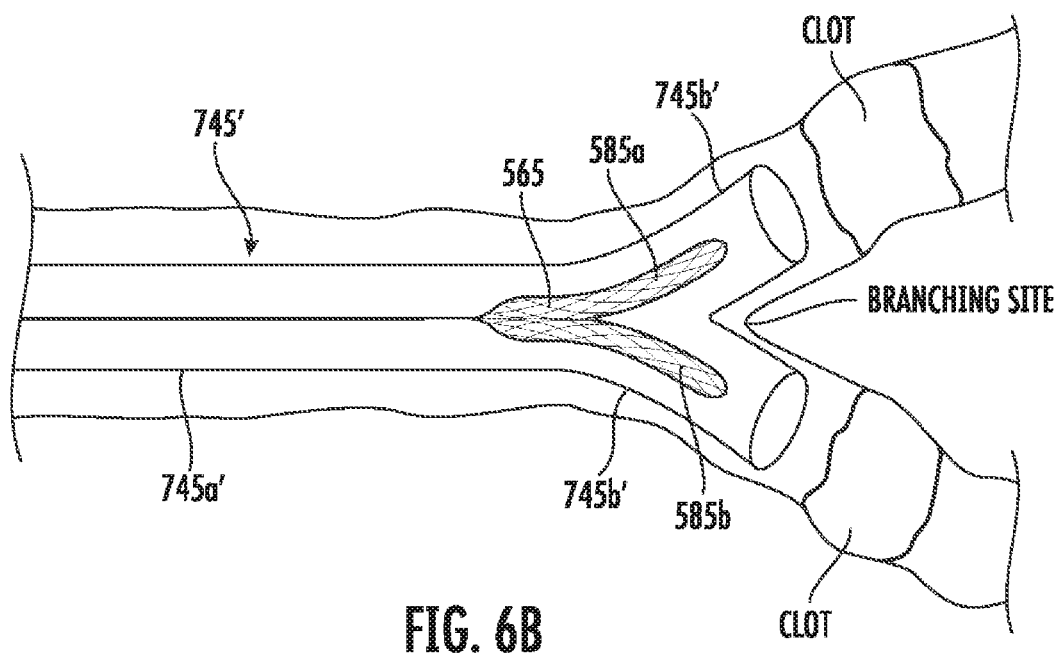
FIG. 6B depicts the mechanical thrombectomy device of FIG. 6A with the secondary self-expanding cage structures bifurcated, divisible, separated or split apart so as to be advanceable through the respective branch lumen of the branched distal section of the microcatheter while remaining in a non-actuated/non-deployed state (i.e., radially compressed state)
Figure 6C:
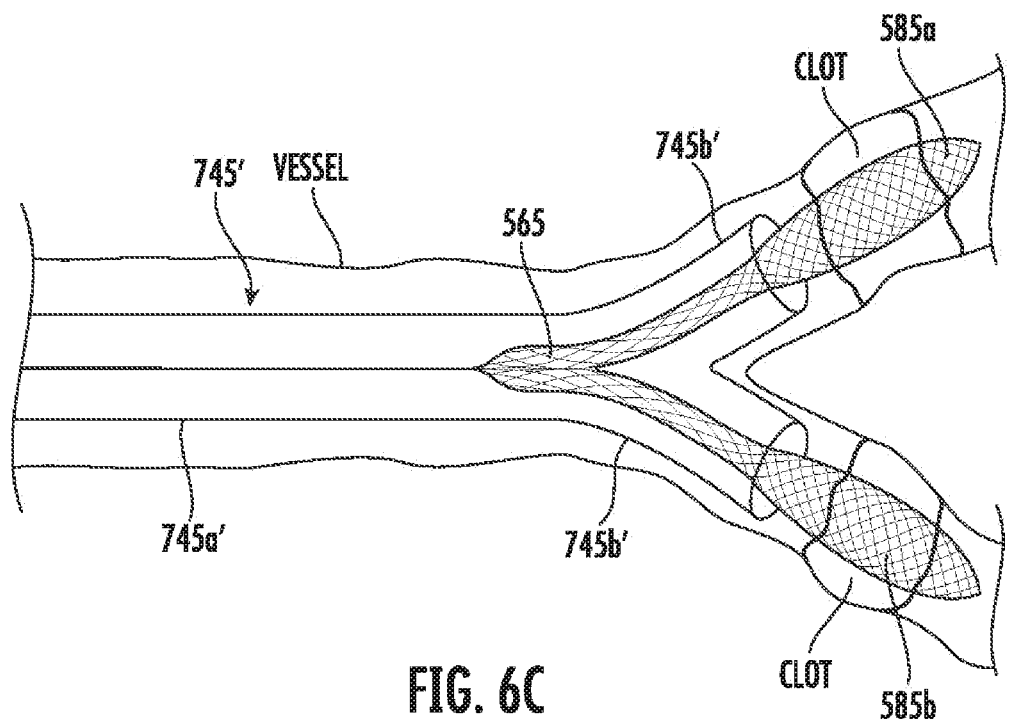
FIG. 6C depicts the mechanical thrombectomy device of FIG. 6B with distal portions of the respective secondary self-expanding cage structures depicted in an actuated/deployed state (i.e., radially expanded state unsheathed from the branched lumen of the microcatheter) while traversing distal occlusion in respective branch vessels captured therein.
Figure 6D:
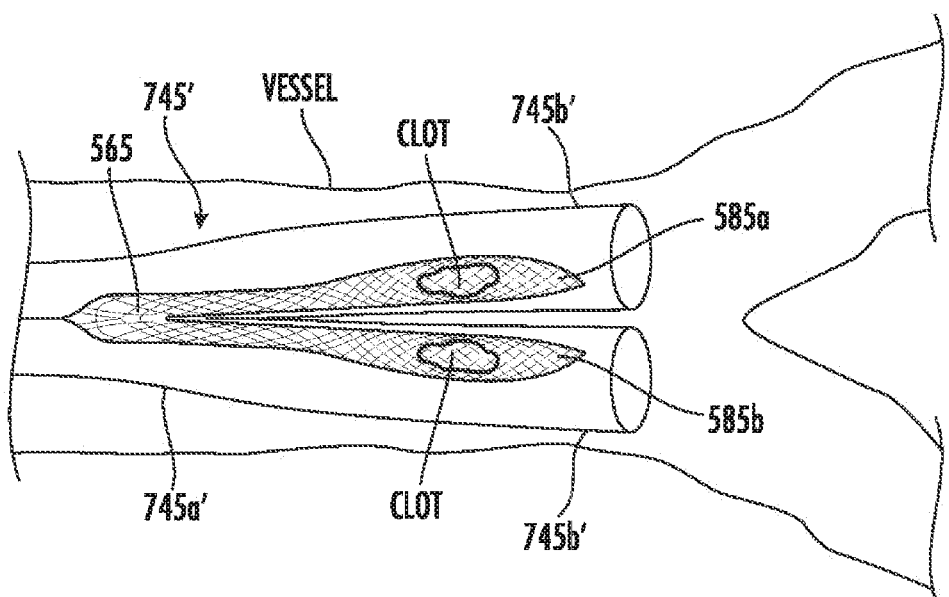
FIG. 6D depicts the mechanical thrombectomy device with the secondary self-expanding cage structures of the mechanical thrombectomy device along with the captured distal occlusion therein of FIG. 6C first retrieved back through the corresponding branch lumen of the microcatheter and then subsequent simultaneous withdraw in a proximal direction of the branched microcatheter and mechanical thrombectomy device.

Next the mechanical thrombectomy device while the secondary self-expanding cage structures 585*a*, 585*b* are secured together (e.g., twisted or mechanical latch mechanism) is introduced into the proximal end of the branched microcatheter 745'. Prior to reaching the separated branch tubular structures 745'*b* of the microcatheter 745', the secondary self-expanding cage structures 585*a*, 585*b* of the mechanical thrombectomy device are released (e.g., untwisted or release of mechanical latch mechanism in response to an affirmative action by the interventionalist such as pulling on a wire) reverting to their original separated arrangement (FIG. 6B). Continued pushing in a distal direction on the mechanical thrombectomy device via the pull wire unsheathes the separated secondary self-expanding cage structures 585*a*, 585*b* from the branch tubular structures 745'*b* of the microcatheter and into associated branch vessels (FIG. 6C). In FIG. 6C, those distal portions of the secondary self-expanding cage structures 585*a*, 585*b* upon emerging out from the distal end/tip of the respective branch tubular structures 745'*b* of the microcatheter automatically expand radially capturing in tandem the clot in each of the branch vessels. The secondary self-expanding cage structures with the clot captured in each are simultaneously drawn back into the respective branch tubular sections 745'*b* of the microcatheter 745'. Lastly, in FIG. 6D the microcatheter 745' along with the mechanical thrombectomy device and captured clots therein are withdrawn from the vessel. As illustrated in FIGS. 6A-6D), on a proximal side/face of the branching site the respective secondary self-expanding cage structures 585*a*, 585*b* automatically actuate/deploy (i.e., expand radially) when unsheathed from the respective branch tubular structures 745'*b* of the microcatheter 745'. Alternatively, the secondary self-expanding cage structures 585*a*, 585*b*, may traverse/cross the clot before being actuated/deployed in response to an affirmative action by the interventionalist (e.g., pulling on a wire to release a locking mechanism).

Figure 10A:
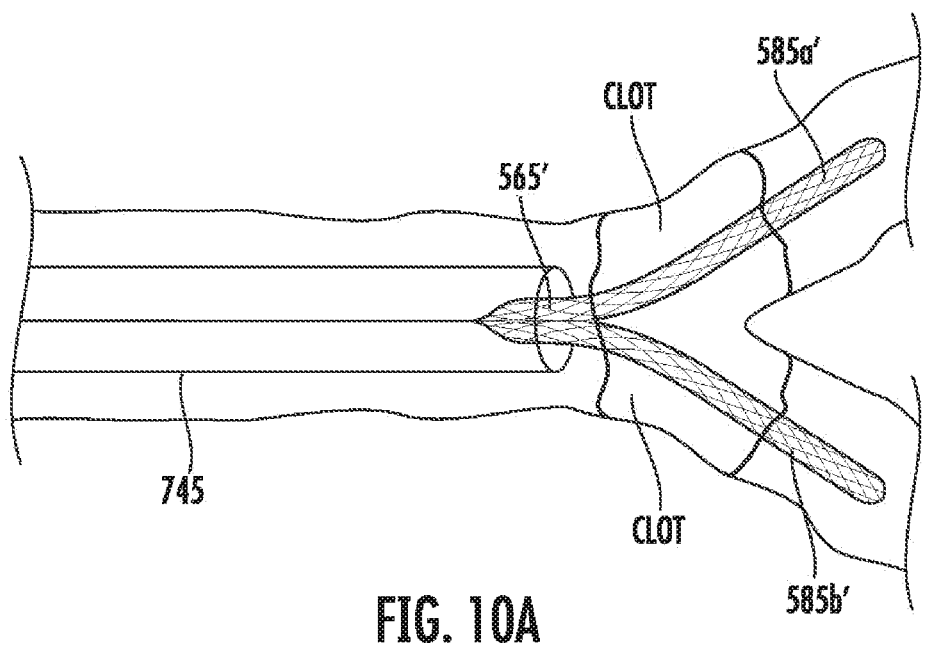
FIG. 10A depicts yet another configuration of a mechanical thrombectomy device deliverable via a single microcatheter (having a non-branched cylindrical tube configuration) to a branching site in which a single vessel branches off into multiple branch vessels; the mechanical thrombectomy device has a single primary self-expanding cage structure proximal section and a bifurcated, divisible, splitable or separable distal section of two secondary self-expanding cage structures (e.g., forked or V-shape); wherein the single primary self-expanding cage structure proximal section has yet to be unsheathed from the microcatheter while the two secondary self-expanding cage structures of the mechanical thrombectomy device are unsheathed from the microcatheter and unsecured (e.g., untwisted) from one another traversing the clot; all self-expanding cage structures depicted in a non-actuated/non-deployed state (i.e., radially compressed state)
Figure 10B:
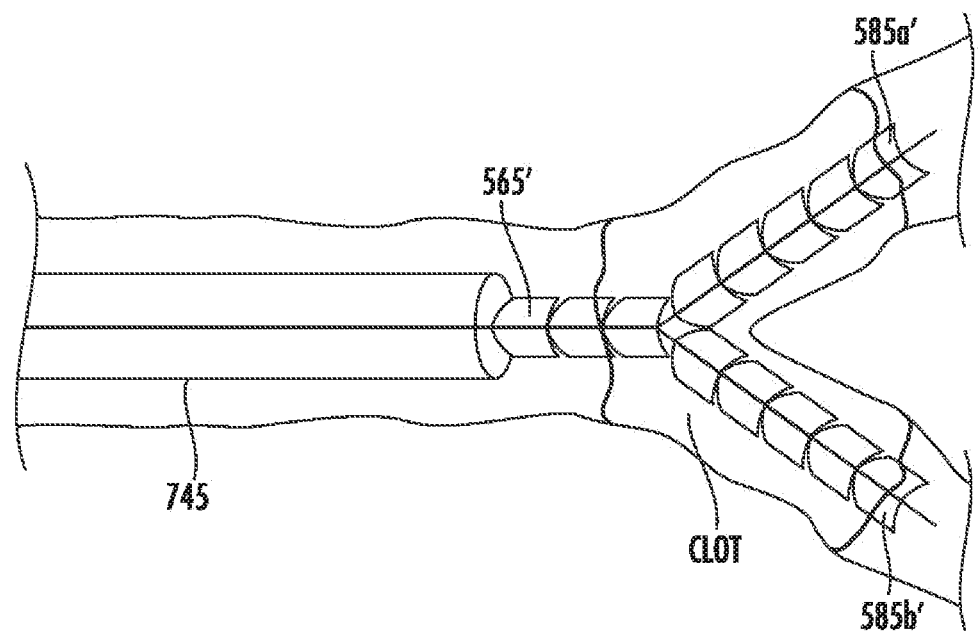
FIG. 10B depicts the mechanical thrombectomy device of FIG. 10A with the single primary self-expanding cage structure and the two secondary self-expanding cage structures depicted in an actuated/deployed (i.e., radially expanded state) across the clot.

The last configuration represented in FIGS. 10A & 10B depict capture and retrieval of distal embolization in more than one branch vessel of a branching site in tandem. Like that in FIG. 6A-6D, the present inventive mechanical thrombectomy device in FIGS. 10A & 10B has a proximal section 565' comprising a primary self-expanding cage structure with a distal section bifurcated, divisible, splitable or separable into a plurality of secondary self-expanding cage structures 585'*a*, 585'*b*. Once again, the distal section of the exemplary mechanical thrombectomy device in FIGS. 10A & 10B is forked into two secondary self-expanding cage structures, but more than two is also possible. Rather than the branched microcatheter 745' used in FIGS. 6A-6D, in FIGS. 10A & 10B a single microcatheter 745 having a non-branched single tube configuration is employed to deliver the mechanical thrombectomy device to the target site in the vessel. Secondary self-expanding cage structures 585'*a*, 585'*b* in FIGS. 10A & 10B are releasably secured together (e.g., twisted) to allow unhindered advancement when tracked through the microcatheter 745. Unsheathed from the microcatheter 745 the secondary self-expanding cage structures 585'*a*, 585'*b* automatically separate (e.g., untwist) so that each may be advanced across the clot in respective branch vessels. Alternatively, the release or separation of the self-expanding cage structures 585'*a*, 585'*b* may be in response to some affirmative action on the part of the interventionalist (e.g., pulling in a proximal direction on a release wire). While in a position traversing the clot, the secondary self-expanding cage structures 585'*a*, 585'*b* are actuated/deployed in response to an affirmative action on the part of the interventionalist (e.g., pulling in a proximal direction on a deployment wire) capturing therein that portion of the clot within the respective branch vessel, as shown in FIG. 10B. Preferably, the proximal primary self-expanding cage structure 565' is also unsheathed from the microcatheter 745 and actuated/deployed (automatically when unsheathed from the microcatheter or in response to an affirmative action by the interventionalist such as pulling on a wire) capturing therein that portion of the clot disposed on the proximal side/face of the branching site and fragments/debris from the captured clot. During retrieval, the mechanical thrombectomy device together with the captured clot therein are withdrawn back into the microcatheter 745.

The distal section of the inner mechanical thrombectomy device in FIGS. 5A-5E as well as the distal section of the mechanical thrombectomy device in FIGS. 6A-6D & FIGS. 10A-10B each comprise two secondary self-expanding cage structures; however, any desired number of two or more secondary self-expanding cage structures are possible. Moreover, the multiple secondary self-expanding cage structures are advanceable in a distal direction into respective branch vessels of a branching site to capture in tandem occlusions therein. Various configurations have been illustrated and described for capture and retrieval of distal occlusion at a vessel branching site using a single microcatheter having a plurality of branch lumen or a single microcatheter having a non-branched cylindrical tube configuration for delivery of a mechanical thrombectomy device configured as a nested mechanical thrombectomy assembly. Any particular feature in any one configuration of the mechanical thrombectomy device illustrated and described above may be employed in any other configuration or embodiment.

Thus, while there have been shown, described, and pointed out fundamental novel features of the invention as applied to a preferred embodiment thereof, it will be understood that various omissions, substitutions, and changes in the form and details of the systems/devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A nested mechanical thrombectomy assembly deliverable as a single assembled unit comprising:
    an outermost mechanical thrombectomy device actuatable from a radially compressed state to a radially expanded state; the outermost mechanical thrombectomy device forming an inner channel extending in an axial direction;
    a proximal shaft having a lumen extending in an axial direction therethrough; a distal end of the proximal shaft is connected to a proximal end of the outermost mechanical thrombectomy device such that the inner channel is in communication with the lumen of the proximal shaft;

at least one inner mechanical thrombectomy device actuatable from a radially compressed state to a radially expanded state; while in the radially compressed state, the at least one inner mechanical thrombectomy device is disposed in the inner channel of the outermost mechanical thrombectomy device; and a wire extending through the lumen of the proximal shaft and connected to a proximal end of the at least one inner mechanical thrombectomy device;

wherein each of the outermost mechanical thrombectomy device and the at least one inner mechanical thrombectomy device is actuatable independently of one another.

2. The nested mechanical thrombectomy assembly according to claim 1, wherein the at least one inner mechanical thrombectomy device comprises a plurality of inner thrombectomy devices arranged in the inner channel of the outermost mechanical thrombectomy device.

3. The nested mechanical thrombectomy assembly according to claim 2, wherein the plurality of inner thrombectomy devices are arranged: (i) parallel to one another within the inner channel of the outermost mechanical thrombectomy device; or (ii) concentrically within the inner channel of the outermost mechanical thrombectomy device.

4. The nested mechanical thrombectomy assembly according to claim 1, wherein the at least one inner mechanical thrombectomy device further comprises a proximal section and a distal section; and wherein the proximal section is a single primary self-expanding cage structure while the distal section is a plurality of secondary self-expanding cage structures connected to each other only at an interface with the single primary self-expanding cage structure and releasably securable together in direct physical contact; each of the single primary self-expanding cage structure and the plurality of secondary self-expanding cage structures being actuatable from the radially compressed state to the radially expanded state.

5. The nested mechanical thrombectomy assembly according to claim 1, further comprising a mechanical restraining device comprising: (i) a securing ring crimped about the proximal shaft imposing a predetermined force on the wire disposed therein; or (ii) an auxiliary wire connecting the outermost mechanical thrombectomy device and the at least one inner mechanical thrombectomy device.

6. The nested mechanical thrombectomy assembly according to claim 1, wherein the at least one inner mechanical thrombectomy device disposed in the inner channel of the outermost mechanical thrombectomy device has a distal section folded over in a proximal direction onto itself.

7. A method for using a nested mechanical thrombectomy assembly comprising: an outermost mechanical thrombectomy device actuatable from a radially compressed state to a radially expanded state; the outermost mechanical thrombectomy device forming an inner channel extending in an axial direction; a proximal shaft having a lumen extending in an axial direction therethrough; a distal end of the proximal shaft is connected to a proximal end of the outermost mechanical thrombectomy device such that the inner channel is in communication with the lumen of the proximal shaft; at least one inner mechanical thrombectomy device actuatable from a radially compressed state to a radially expanded state; while in the radially expanded state, the at least one inner mechanical thrombectomy device is disposed in the inner channel of the outermost mechanical thrombectomy device; and a wire extending through the lumen of the proximal shaft and connected to a proximal end of the at least one inner mechanical thrombectomy device; wherein each of the outermost mechanical thrombectomy device and the at least one inner mechanical thrombectomy device is actuatable independently of one another; the method comprising the steps of:

navigating a guidewire through a vessel to a target site;

tracking a single microcatheter over the guidewire;

withdrawing the guidewire in a proximal direction from the single microcatheter;

while each of the single outermost mechanical thrombectomy device and the at least one inner mechanical thrombectomy device are in the radially compressed state, advancing the nested mechanical thrombectomy assembly through the single microcatheter;

capturing at least one occlusion in the nested mechanical thrombectomy assembly by independently actuating: (i) the single outermost mechanical thrombectomy device; and/or (ii) the at least one inner mechanical thrombectomy device; and simultaneously withdrawing the single microcatheter and the nested mechanical thrombectomy assembly along with the at least one occlusion captured therein from the vessel.

8. The method according to claim 7, wherein the capturing step comprises:

while the at least one inner mechanical thrombectomy device remains non-actuated, independently actuating the single outermost mechanical thrombectomy device when unsheathed from the single microcatheter withdrawn in the proximal direction; the actuated single outermost thrombectomy device transitioning to the radially expanded state anchored in place in direct physical contact with the inner wall of the vessel.

9. The method according to claim 8, wherein the at least one inner mechanical thrombectomy device is never actuated and maintained in the radially compressed state disposed within the inner channel of the outermost mechanical thrombectomy device; and the at least one occlusion is captured in the actuated single outermost mechanical thrombectomy device.

10. The method according to claim 8, wherein the capturing step further comprises the step of: following actuation of the single outermost mechanical thrombectomy device anchored in position within the vessel, independently actuating the at least one inner mechanical thrombectomy device when advanced in a distal direction out from the inner channel of the single outermost mechanical thrombectomy device capturing the at least one occlusion therein.

11. The method according to claim 7, wherein the capturing step comprises while the outermost mechanical thrombectomy device is never actuated, independently actuating the at least one inner mechanical thrombectomy device when advanced in a distal direction out from the inner channel of the single outermost mechanical thrombectomy device capturing the at least one occlusion therein.

12. The method according to claim 7, wherein the at least one inner mechanical thrombectomy device is at least two inner mechanical thrombectomy devices arranged in the inner channel of the outermost mechanical thrombectomy device.

13. The method according to claim 12, wherein the at least two inner mechanical thrombectomy devices are arranged: (i) parallel to one another within the inner channel of the outermost mechanical thrombectomy device; or (ii) concentrically within the inner channel of the outermost mechanical thrombectomy device.

14. The method according to claim 7, wherein the target site is at a branching site in which a single vessel branches off into multiple branch vessels; wherein the capturing step comprises:
- independently actuating the single outermost mechanical thrombectomy device unsheathed from the single microcatheter withdrawn in the proximal direction transitioning to the radially expanded state anchored in place in direct physical contact against the inner wall of the single vessel on a proximal side of the branching site;
- while the single outermost mechanical thrombectomy device is independently actuated and anchored in position, independently actuating the at least one inner mechanical thrombectomy device advanced in a distal direction out from the inner channel of the single outermost mechanical thrombectomy device and into one of the multiple branch vessels capturing the at least one occlusion in the actuated at least one inner mechanical thrombectomy device; and
- wherein during the step of withdraw of the nested mechanical thrombectomy assembly, capturing of any fragmentation of the at least one occlusion in the actuated single outermost mechanical thrombectomy device.

15. The method according to claim 7, wherein while in the radially compressed state within the inner channel of the single outermost mechanical thrombectomy device the at least one inner mechanical thrombectomy device has a distal portion folded over in a proximal direction onto itself; and the actuating step comprises actuating the at least one inner mechanical thrombectomy device when unsheathed from the inner channel of the single outermost mechanical thrombectomy device such that the distal portion folded over in the proximal direction onto itself is unfurled in the distal direction.

16. The method according to claim 7, wherein the actuating step comprises overcoming a predetermined restraining force prohibiting unintentional actuation of the nested mechanical thrombectomy assembly, wherein the predetermined restraining force is produced by a mechanical restraining device comprising: (i) a securing ring crimped about the proximal shaft imposing a predetermined force on the wire disposed therein; or (ii) an auxiliary wire connecting the outermost mechanical thrombectomy device and the at least one inner mechanical thrombectomy device.

\* \* \* \* \*